US009640014B2

(12) United States Patent
Pritchard et al.

(10) Patent No.: US 9,640,014 B2
(45) Date of Patent: May 2, 2017

(54) VENDING MACHINE WITH ELEVATOR DELIVERY OF VENDED PRODUCT TO CUSTOMER ACCESS

(75) Inventors: Grant Pritchard, West Des Moines, IA (US); Jeffrey W. Mayoros, Clive, IA (US); Santosh Lad, West Des Moines, IA (US)

(73) Assignee: FAWN ENGINEERING CORPORATION, Des Moines, IA (US)

( * ) Notice: Subject to any disclaimer, the term of this patent is extended or adjusted under 35 U.S.C. 154(b) by 30 days.

(21) Appl. No.: 13/343,609

(22) Filed: Jan. 4, 2012

(65) Prior Publication Data

US 2012/0277904 A1 Nov. 1, 2012

Related U.S. Application Data

(60) Provisional application No. 61/460,538, filed on Jan. 4, 2011, provisional application No. 61/460,594, filed on Jan. 5, 2011.

(51) Int. Cl.

*G06F 17/00* (2006.01)
*B65G 59/00* (2006.01)

(Continued)

(52) U.S. Cl.

CPC ................ *G07F 11/04* (2013.01); *G07F 9/02* (2013.01); *G07F 11/165* (2013.01); *G07F 11/36* (2013.01)

(58) Field of Classification Search

CPC .......... G07F 9/02; G07F 11/04; G07F 11/165; G07F 11/36

(Continued)

(56) References Cited

U.S. PATENT DOCUMENTS

| | | | |
|---|---|---|---|
| 3,193,138 A | | 7/1965 | Cox et al. |
| 3,283,273 A | | 11/1966 | Pearse |

(Continued)

FOREIGN PATENT DOCUMENTS

| | | |
|---|---|---|
| EP | 0166539 | 1/1986 |
| WO | 9524145 | 9/1995 |

(Continued)

OTHER PUBLICATIONS

Fawn Engineering Corporation, PCT/US2012/020227, "Notification of Transmittal of the International Search Report and the Written Opinion of the International Searching Authority, or the Declaration", mailed Mar. 27, 2012.

(Continued)

*Primary Examiner* — Michael K Collins

(74) *Attorney, Agent, or Firm* — McKee, Voorhees & Sease, PLC

(57) ABSTRACT

An automated vending or merchandizing machine includes an elevator sub-assembly which moves a dispensing bin or elevator tray vertically along the fronts of plural vertical levels of product dispensers in the vending machine. A controller tracks the vertical position of the elevator tray. This allows the controller to send the elevator tray to the vertical level of the dispenser of the product selected by a customer, at that level receive and confirm dispensing of the selected product into the elevator tray, and return the elevator tray holding the dispensed product down to a customer delivery or access door or opening in the vending machine that can below the vertical levels of dispensers. Features can include coordination of locking and unlocking of a customer access door and actuating an anti-cheat security baffle with the position of the elevator tray.

5 Claims, 31 Drawing Sheets

ELEVATOR MACHINE PARTS

(51) Int. Cl.

| | |
|---|---|
| *B65D 83/00* | (2006.01) |
| *G07F 11/04* | (2006.01) |
| *G07F 9/02* | (2006.01) |
| *G07F 11/16* | (2006.01) |
| *G07F 11/36* | (2006.01) |

(58) Field of Classification Search
USPC .............................. 700/232, 237, 242, 243
See application file for complete search history.

(56) References Cited

U.S. PATENT DOCUMENTS 3,291,035 A * 12/1966 Ignelzi .................... G07F 9/105 219/388
3,549,045 A 12/1970 Rosenhagen
3,606,959 A 9/1971 Stonor
3,608,777 A * 9/1971 Bodoh .................... G07F 11/38 221/129
3,796,294 A 3/1974 Hoffer et al.
3,862,704 A 1/1975 Millies et al.
4,108,333 A * 8/1978 Falk ........................ G07F 9/105 198/817
4,171,667 A 10/1979 Miller et al.
4,398,651 A 8/1983 Kumpfer
4,418,836 A 12/1983 Christian
4,469,245 A 9/1984 Fish et al.
4,483,459 A 11/1984 Taylor et al.
4,530,444 A 7/1985 Christian
4,549,170 A 10/1985 Serres et al.
4,583,658 A 4/1986 Israel
4,757,915 A 7/1988 Albright et al.
4,858,743 A 8/1989 Paraskevakos et al.
4,974,747 A 12/1990 Ahlstrom
4,986,441 A 1/1991 Kanbe et al.
5,211,296 A 5/1993 D'Heygere
5,273,183 A 12/1993 Tuttobene
5,671,604 A 9/1997 Rudick
5,791,516 A 8/1998 Wittern, Jr. et al.
5,881,911 A 3/1999 Burdette et al.
5,893,615 A 4/1999 Hendricks
5,957,043 A 9/1999 Font
6,003,725 A 12/1999 Blankenau et al.
6,047,855 A 4/2000 Lin
6,083,270 A 7/2000 Scott
6,102,248 A 8/2000 Yamamiya
6,112,497 A 9/2000 Credle, Jr.
6,199,720 B1 * 3/2001 Rudick ................... G07F 11/08 221/13
6,230,930 B1 * 5/2001 Sorensen et al. ............. 221/131
6,230,932 B1 5/2001 Lowing et al.
6,247,610 B1 * 6/2001 Ziesel et al. .................. 221/171
6,253,954 B1 * 7/2001 Yasaka ............................ 221/93
6,279,719 B1 8/2001 Israel
6,286,715 B1 * 9/2001 Ziesel et al. .................. 221/171
6,328,180 B1 * 12/2001 Sorensen et al. ............. 221/131
6,383,542 B1 5/2002 Khodor et al.
6,439,425 B1 8/2002 Masek
6,494,342 B1 12/2002 Wittern, III et al.
6,513,677 B1 2/2003 Sorensen et al.
6,540,100 B2 4/2003 Credle, Jr. et al.
6,556,889 B2 4/2003 Rudick et al.
6,571,988 B2 * 6/2003 Bowen .................... G07F 11/10 221/250
6,582,037 B1 6/2003 Rudick et al.
6,688,435 B1 2/2004 Will et al.
6,719,168 B2 * 4/2004 Nicolini .................. G07F 11/42 221/191
6,742,673 B2 6/2004 Credle, Jr. et al.
6,808,082 B2 10/2004 Ohkubo
6,983,418 B1 1/2006 Scott
7,055,716 B2 * 6/2006 Holdway ................ G07F 11/16 221/131
7,222,748 B2 5/2007 Holdway et al.
7,246,749 B2 7/2007 Rumble
7,303,093 B2 12/2007 Ward
7,447,563 B2 11/2008 Dobos
7,451,891 B2 * 11/2008 Carter ................... G07F 11/165 221/210
7,565,222 B2 7/2009 Popelka
7,686,185 B2 3/2010 Zychinski
7,712,628 B2 5/2010 Guindulain Vidondo
7,802,700 B2 * 9/2010 Ardern .................... G07F 11/16 221/123
7,819,282 B2 10/2010 Israel
7,837,058 B2 * 11/2010 Collins ................. G07F 11/165 212/319
7,837,059 B2 * 11/2010 Hieb ....................... G07F 11/10 221/122
8,002,144 B2 * 8/2011 Percy ............................ 221/224
8,061,555 B2 * 11/2011 Guglielmi ............. G07F 11/007 194/212
8,096,444 B2 * 1/2012 Ardern .................... G07F 11/16 221/124
8,534,494 B2 * 9/2013 Black et al. .................. 221/133
8,556,119 B2 * 10/2013 Skavnak et al. .................. 221/1
2001/0000609 A1 5/2001 Rudick et al.
2003/0146238 A1 8/2003 Beuregard
2004/0140317 A1 7/2004 Forte
2005/0067426 A1 3/2005 Holdway et al.
2005/0155977 A1 7/2005 Popelka
2006/0042193 A1 3/2006 Elustondo
2006/0261080 A1 11/2006 Matsumoto et al.
2007/0021866 A1 1/2007 Coppola et al.
2007/0267087 A1 11/2007 Jones et al.
2008/0099501 A1 5/2008 Ward
2008/0148685 A1 * 6/2008 Kim .................................. 53/77
2009/0029016 A1 1/2009 Pfister et al.
2009/0076650 A1 * 3/2009 Faes ...................... G07F 11/165 700/232
2010/0084421 A1 4/2010 Lazalier et al.
2010/0300041 A1 12/2010 Kim
2011/0017761 A1 * 1/2011 Roncari .................. G07F 11/42 221/1
2011/0024441 A1 2/2011 Marin et al.
2011/0226795 A1 * 9/2011 Sichich ................. G07F 11/165 221/1
2012/0277904 A1 11/2012 Pritchard et al.

FOREIGN PATENT DOCUMENTS

WO 9949429 9/1999
WO WO 2006/130814 A2 12/2006
WO WO 2009/138864 A1 11/2009

OTHER PUBLICATIONS

"2010 ADA Standards for Accessible Design", Department of Justice, Sep. 15, 2010, pp. 1-4, 28-33, 118, 157-161, http://www.ada.gov/regs2010/2010ADAStandards/2010ADAstandards.htm [retrieved from Internet on Mar. 14, 2010].
Food Merchandiser Service Manual, Model 3005, Part No. 4200258, Rev. Nov. 1988, 30 pages.
Cold Food Marchandiser Model 3007, Service Manual, Jan. 1990, 36 pages.

* cited by examiner

TRAY SPACE (USABLE PRODUCT SPACE 37 ½")

ELEVATOR SHOWN IN STANDBY MODE

- READY TO VEND
- THE DELIVERY DOOR IS LOCKED AND THE SECURITY BAFFLE IS OPEN

A SELECTION IS MADE

- THE ELEVATOR MOVES TO THE SELECTED SHELF LEVEL
- THE DELIVERY DOOR FLAP REMAINS LOCKED & THE SECURITY BAFFLE REMAINS OPEN

THE SPIRAL MOTOR OPERATES

- THE VENDED PRODUCT SLIDES ONTO THE ELEVATOR & PASSES THROUGH THE I-VEND DETECTOR BEAM

THE ELEVATOR MOVES DOWN AND STOPS AT THE 'PARK' POSITION

➢ THE DELIEVRY DOOR REMAINS LOCKED

THE SECURITY BAFFLE DOOR CLOSES

➢ THE DELIVERY DOOR IS STILL LOCKED

ELEVATOR CONTINUES DOWN TO THE 'VEND' POSITION

- THE DELIVERY DOOR IS NOW UNLOCKED AND REMAINS SO FOR 1 MINUTE

THE DELIVERY DOOR FLAP IS OPENED

➢ THE USER TO RETRIEVES THE VENDED ITEM

AFTER THE DELIVERY DOOR IS CLOSED THE ELEVATOR RETURNS TO THE 'STANDBY' POSITION

- SAFETY - THE DELIVERY DOOR FLAP MUST BE CLOSED BEFORE THE ELEVATOR CAN MOVE
- AS THE ELEVATOR STARTS TO MOVE UP THE DELIVERY DOOR FLAP IS LOCKED CLOSED

SECURITY BAFFLE IS OPENED -

- THE MACHINE IS NOW BACK TO STANDBY AND READY TO VEND
- IF A USER WISHES TO UNLOCK THE DELIVERY DOOR THE # KEY CAN BE PRESSED

ELEVATOR HARDWARE SCHEME

| | |
|---|---|
| Elevator Motor: | 24VDC/Gearbox, Typical Load Current: 2.5A, Locked Rotor Current 8A, Speed 200rpm (elevator speed 7.2"/Second) 8 in-lb load |
| Security Baffle Motor: | 24VDC/Gearbox, Typical Load Current: 120mA, Locked Rotor Current TBD, Speed 20rpm |

NOTES:

1. Elevator Motor current to be limited to 3A Max.
2. Start & Stop Elevator Motor (EM) at the equivalent of 10V for first/last 400mS
3. Slow Mode - 10V (TBD) – may need to make slower & have initial ramp to get motor started

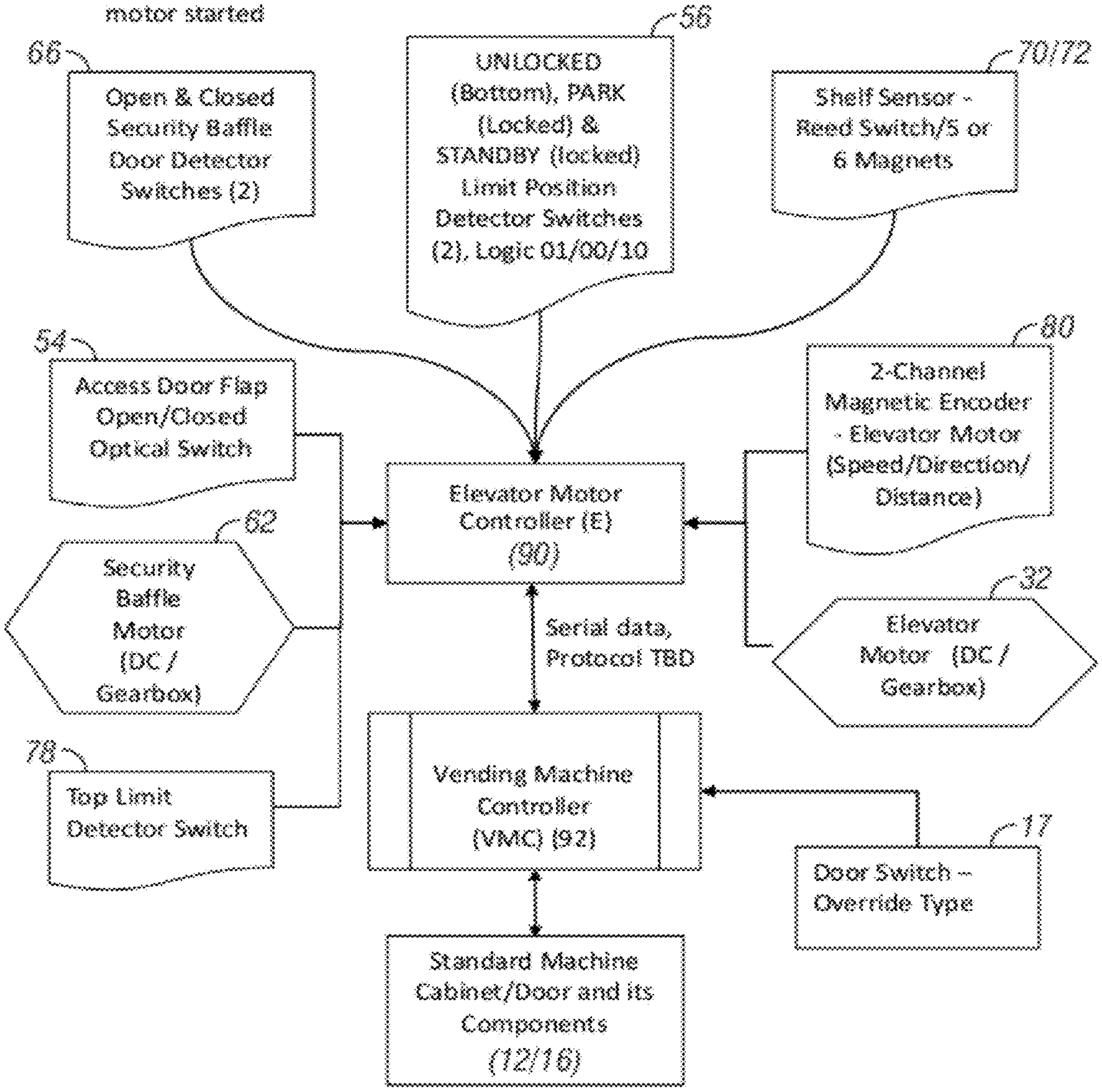

Fig. 12

Input Table - Elevator Controller

| No. | Input Device | Function | Detail | Value | | | | |
|---|---|---|---|---|---|---|---|---|
| 1 - 5 | Detector Switch - Omron | Delivery Flap Lock-slide S1 | Switching Current 30 VDC | 0.1 A (resistive load) | | | | |
| | | Delivery Flap Lock-slide S2 | Operating Frequency | Mech: 60 ops/min max. | | | | |
| | | Security Baffle - Open Status | | Elect: 30 ops/min max. | | | | |
| | | Security Baffle - Closed Status | OF max. | 0.49 N ( 50 gf) | | | | |
| | | Elevator Top Limit | RF min. | 0.02 N (2 gf) | | | | |
| | | | OP | 0.52 to 2.35 mm | | | | |
| | | | TTP min. | 6.34 mm | | | | |
| 6 | Encapsulated Reed Switch | Elevator Shelf Sensor | **Magnetic Properties** | **Conditions** | **Min** | **Typ** | **Max** | **Unit** |
| | 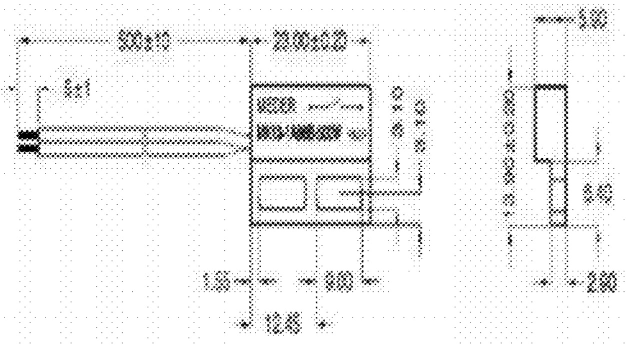 | | Pull in | 20C | 23 | | 44 | AT |
| | | | Test equipment KMS-14 | | KMS-14 | | | |
| | | | **Special Product Data** | | | | | |
| | | | Contact | | A - NO | | | |
| | | | Contact Rating (Any DC combination of V/A) | Not to exceed their individual max.'s | | | 10 | W |
| | | | Operating Voltage | DC or Peak AC | | | 180 | VDC |
| | | | Operating Current | DC or Peak AC | | | 1.25 | A |
| | | | Switching Current | | | | 0.5 | A |
| | | | Sensor Resistance | Measured @ 40% overdrive | | | 320 | mOhm |
| | | | Housing Material | | PBT glass fibre reinforced | | | |
| | | | Case Color | | White | | | |
| | | | Sealing Compound | | Polyurethane | | | |
| 7 | Magnetic Encoder - Dual Channel | Mounted to Elevator Motor - speed/distance/direction | Merkle Korffe - Data to follow | | | | | |
| 8 | Serial Bus | Type - 232 | Speed - 9.6kB | Protocol TBD | | | | |
| 9 | Primary Input Voltage | From a Step-Down Transformer | at 95V Primary Input - 20.5VAC @ 3A - 50% duty 2.5s ON/OFF<br>at 95V Primary Input - 19.9VAC @ 4A - 20% duty 0.1S ON/0.4S OFF | | | | | |

Fig. 14

| ELEVATOR SUB-ASSEMBLY PARTS LIST | | |
|---|---|---|
| ITEM NO. | 3561 | DESCRIPTION |
| 1 | 1 | ELEVATOR WELDED FRAME |
| 2 | 1 | LEFT SIDE LED ASSEMBLY |
| 3 | 1 | RIGHT SIDE LED ASSEMBLY |
| 4 | 1 | TOP LED ASSEMBLY |
| 5 | 1 | ELEVATOR MOUNTING BRACKET STAKE - |
| 6 | 1 | ELEVATOR MOUNTING BRACKET STAKE - |
| 7 | 4 | TYPE#5 NYLINER 5/16ID |
| 8 | 6 | 8-32X3/8 PHL PH TYP-T |
| 9 | 16 | #6-32 HEX NUT W/NYLON INSERT |
| 10 | 2 | XL(.200) TIMING BELT PULLEY |
| 11 | 2 | BOTTOM PULLEY BRACKET TENSIONER |
| 12 | 20 FT | XL(.200) TIMING BELT |
| 13 | 1 | ELEVATOR DC MOTOR-150 RPM |
| 14 | 2 | BELT FIXING BRACKET TOP |
| 15 | 2 | BELT FIXING BRACKET BOTTOM |
| 16 | 1 | ELEVATOR STOPPER BRACKET-LH |
| 17 | 1 | ELEVATOR STOPPER BRACKET-RH |
| 18 | 2 | LOWER PULLEY SHAFT- Ø 5/16" |
| 19 | 1 | SS ROD Ø 5/16" |
| 20 | 1 | SHAFT COUPLING Ø 5/16" |
| 21 | 1 | FLANGE BEARING |
| 22 | 1 | SNAP-FIT SWITCH |
| 23 | 1 | HARNESS TRACK BRACKET |
| 24 | 1 | ELEVATOR MOTOR COVER |
| 25 | 1 | IVEND/REED SWITCH HARNESS |
| 26 | 6 | #4 X .25 FPH SMS TYPE AB |
| 27 | 2 | FLAT PULLEY |
| 28 | 2 | SLIDE RAIL – 52" LONG |
| 29 | 12 | 8-32 X 3/8 UNDERCUT FH MS ZN |
| 30 | 1 | DELIVERY BUCKET ASSEMBLY |
| 31 | 1 | HARNESS TRACK SUPPORT BRACKET |
| 32 | 2 | E-RING, Ø 5/16" |
| 33 | 4 | 8-32 NICKEL PLATED ACORN NUT |
| 34 | 4 | 10-24 X 1/4 PHIL PH MS |
| 35 | 2 | CARRIAGE |
| 36 | 1 | ELEVATOR ADVERTISING PANEL |
| 37 | 10 | 8-32 X 3/8" PHIL PH MS |
| 38 | 2 | 8-32 HEX NUT W/NYLON INSERT |

Fig. 15C

VENDING MACHINE WITH ELEVATOR DELIVERY OF VENDED PRODUCT TO CUSTOMER ACCESS

CROSS-REFERENCE TO RELATED APPLICATIONS

This application claims priority under 35 U.S.C. §119 to provisional applications Ser. No. 61/460,538 filed Jan. 4, 2011, and Ser. No. 61/460,594, filed Jan. 5, 2011, each of which is herein incorporated by reference in its entirety.

I. BACKGROUND

A variety of dispensing and delivery methods are used in vending machines. For multiple product types, shapes, or sizes, two conventional methods are either: (a) individual horizontal dispensers which drop one product at a time to a dispensing bin for customer access or (b) a carousel which rotates the selected product in a multi-partitioned tray to a vending door for customer access. Others move a product to a chute which guides the product by gravity to a delivery opening.

The drop vend method may not be practical for products that can be damaged or deformed in the drop. Nor may the gravity chute for similar reasons or that some products are not conducive to delivery by gravity. Examples are food items like sandwiches, fruit, and the like. The carousel method is limited in the number of items that can be stocked in the vending machine. If a single carousel, it limits the choices. If multiple carousels they must be stacked and then require separate access doors, instead of a single delivery place. Also, if multiple horizontal trays are stacked vertically in a carousel, it can be difficult for some persons to reach all trays. Such an arrangement may also not meet Americans with Disabilities Act regulations which define an acceptable range of heights from the ground or floor for access to a vended product.

Therefore, there is room for improvement in the art. This room for improvement pertains not only to conventional automated merchandising machines and products (including but not limited to food, snacks, personal hygiene products, phone cards, and other consumables), but also to almost any vending or dispensing application. For example, there are a number of applications where it is desired or advantageous to dispense items to relevant persons. Take for example industrial situations. Tools or tool bits can be dispensed one or one (or in packages) to those authorized. Another is medical situations. Supplies can be dispensed to those authorized. Or dispension can simply be through a machine to anyone, but the machine keeps track of inventory. As can be appreciated by those skilled in this art, there are many different vending or dispensing situations that could benefit from the invention, and it is not limited to typical food, beverage, or snack vending machines.

II. SUMMARY OF THE INVENTION

In one aspect of the present invention, an automated vending or merchandising machine includes an elevator sub-assembly which moves a dispensing bin or elevator tray vertically along the fronts of plural vertical levels of product dispensers in the vending machine. A controller tracks the vertical position of the elevator tray. This allows the controller to (a) send the elevator tray to the vertical level of the dispenser of the product selected by a customer, (b) at that level receive and confirm dispension of the selected product into the elevator tray, and (c) return the elevator tray holding the dispensed product down to a customer delivery or access door or opening in the vending machine that can below the vertical levels of dispensers. Features can include coordination of locking and unlocking of a customer access door and actuating an anti-cheat security baffle with the position of the elevator tray. The coordination can provide high assurance that the selected product is dispensed, there is convenient access to the product for the customer, and there is good security of the other products in the vending machine.

The present invention includes, as a general feature, the concept of a vending machine cabinet having at least one dispenser which moves a row of vendible product to a dispensing location. This includes machines having one or more dispensers on each of a plurality of horizontal shelves top to bottom. Each shelf can hold a plurality of individual back-to-front dispenser cartridges (in one example helix type dispensers) that a customer can select from. However, other dispenser types and methods are possible. In one possible aspect of the invention, a main difference from a conventional vending machine is a vertical elevator automatically moves a bin or tray (it can extend the width of all dispensers on a shelf) from a bottom “stand by” or “ready to vend” position up to just below the shelf of the selected dispenser. The dispenser slides the product into the bin instead of free-falling in a drop zone. Optionally, an optical sensing sub-system can sense if the product is actually moved from dispenser to bin. One example of the optical sensing sub-system has emitters on one side of the elevator just above the bin which direct infrared light in beams in a vertical plane across the vend space just below the front of the dispensers for that tray to detectors on the other lateral side of the bin. Thus, when the product slides out of a dispenser and drops by gravity vertically into the vend space and diagonally down into the elevator bin, it must pass through the beams in the vertical plane. This allows the machine to know a product moved generally horizontally from the dispenser and down into the bin. If the product is sensed, the elevator then automatically moves down to a “park” position which is near a customer-accessible delivery door.

In another possible aspect of the invention, a security baffle (e.g. a horizontal plate or member) can move between positions—a first position out of the elevator passage or space; and a second position into and generally across the elevator passage or space. In one example, the baffle moves basically in a horizontal plane below the lowest shelf containing product dispensers but at a distance above the delivery or access door or flap. It primary function is to block the space above the access door to prevent customers from reaching up through the access door into the product storage space to pilfer from the machine. Note that the delivery door can be locked as an added impediment to cheating. This locking and unlocking of the delivery door could be either manually or automatically controlled.

In another possible aspect of the invention, the elevator can move the elevator tray from a “park” position below the security baffle to a slightly lower “vend” position (below the customer delivery door). The security baffle can be closed over the space above the elevator tray, and the delivery door automatically unlocked. The customer then opens or pivots the delivery door inward and upward and reaches down into the elevator tray to retrieve the vended item on the tray floor. The baffle remains closed (blocking the vend space) and the delivery door can optionally remain unlocked for a pre-set time period (e.g. the longer of one minute or as long as the customer has pivoted the delivery door open). Once the delivery door is released, and/or if over one minute since the door was unlocked, the door can be automatically locked, the baffle retracted, and the elevator is in a stand by or ready-to-vend state to wait for the next vend cycle. The locking and unlocking of the delivery or access door can be coordinated with and/or actuated by movement of the elevator tray.

Other aspects or features of the invention can include one or more of:

1) An elevator to move a delivery tray for dispensed product between a lower position near a customer access door and raised positions at dispensers higher inside the machine. One advantage can be more gentle handling of vended items (they do not drop by gravity for 4 or 5 feet onto a steel bin floor). Optionally the elevator tray can have a specific configuration. In addition to machine-wide, it could have a sloped floor to promote ease of access to vended products by the customer and other features. It can also carry sensors or components to assist in operational features of the system.

2) A full machine width elevator tray that captures items from any of the plural dispensers across a tray or shelf (allows conventional dispensers and trays and vending machine components to be used).

3) A system for automatically finding the correct position to send the elevator bin relative to each shelf. This system can include components (e.g. sensors or limit detectors) which sense actual shelf position and/or shelf position estimation by monitoring operation of the elevator motor. One form of shelf position estimation is:
   a. Markers (e.g. magnets or the steel of the shelf itself) at each shelf position can be sensed by one or more sensors on the elevator. The marker is sensed at each vertical tray position and communicated to a controller.
   b. Another is by optical detection.
   c. Another is mechanical actuators.

4) A component (e.g. non-exclusive dual magnetic encoder driven by the elevator motor shaft) can also signal or inform the controller of elevator status and location. In one example, the controller can determine direction, position, and speed of the delivery bin. As the elevator tray passes each shelf, markers (such as described above) can be detected and the corresponding encoder count is mapped. This can be done automatically or require human intervention at each shelf level to verify and store the appropriate encoder count for each shelf location. This feature can assist in informing the controller of the vertical location and status of the delivery elevator tray or product tray.

5) An optical detector can be positioned on the elevator bin or tray. It can have one or multiple functions. A first function can be to detect whether a product has been dispensed into the delivery bin. Because the detector is at the bin, it can make this detection function (that a product has been vended from a dispenser) at a relative position close to the dispenser (just below the vertical plane of the dispenser instead of at or nearer to the bottom of the whole vending machine). Another possible function is to detect if the customer has removed the dispensed product from the bin once the customer is allowed access to the bin (to assist in informing the machine that the vend is complete in the sense the customer has accessed it and had the opportunity to remove it from the bin). One form the optical detector can take is:
   a. Vertically relative to the bin. The vertical nature of and the placement of the optical sensor on the elevator can inform the vending machine controller (VMC) when a product has vended at the shelf level and allows the vending cycle to continue (if no product sensed vended, the VMC retries a second vend cycle and then stops and displays error message or prompts the customer to select another product). But carrying the sensor on the bin can also sense if the product remains in the bin when at the delivery door.

6) The customer delivery or access door can be automatically maintained locked until certain conditions are met. For example, the door can be maintained locked until the controller decides a vend has occurred, the elevator mechanism has moved the elevator tray to the vend position, and the customer is authorized to access a vended product. The controller can instruct a door lock to unlock. Sensors can allow the controller to monitor the state of the door. One example is limit detectors which tell the controller when a customer door lock slide is locked or unlocked. Another example could be a photo eye activated switch at the customer door to monitor when the door is open or closed by sensing when the door is moved to a position indicative of the opening of the access door.

7) A security baffle can cooperate with the elevator and door. It can include two detectors (e.g. limit detectors) which inform an elevator controller (EC) when the baffle is retracted and when extended. The baffle can block reaching through the customer door and up into the machine to try to cheat or pilfer items from the machine.

8) Optionally, if in "stand by, ready-to-vend" state, a customer can push a button (e.g. "#" on a key pad) to unlock the customer delivery door (as an override, but only if bin is in a pre-determined state). The security baffle usually must be closed before the door can be unlocked.

9) Optionally, other sensors can inform the controller of state of the components. One example is a top limit detector which prevents overrun of elevator past the top shelf.

III. BRIEF DESCRIPTION OF THE DRAWINGS

The attached drawings provide information about exemplary embodiments according to aspects of the present invention. They are for illustration and not a limitation to the invention, which can take many forms and embodiments.

FIG. 12 is a schematic view of hardware components of the elevator of the embodiment of FIGS. 1 to 11A and 11B, including an elevator motor controller (EC).

FIG. 14 is a diagrammatic table which includes details and specifications for certain operations of the EC.

FIG. 15C is an exemplary parts list for the sub-assembly of FIG. 15B.

Figure 15A:
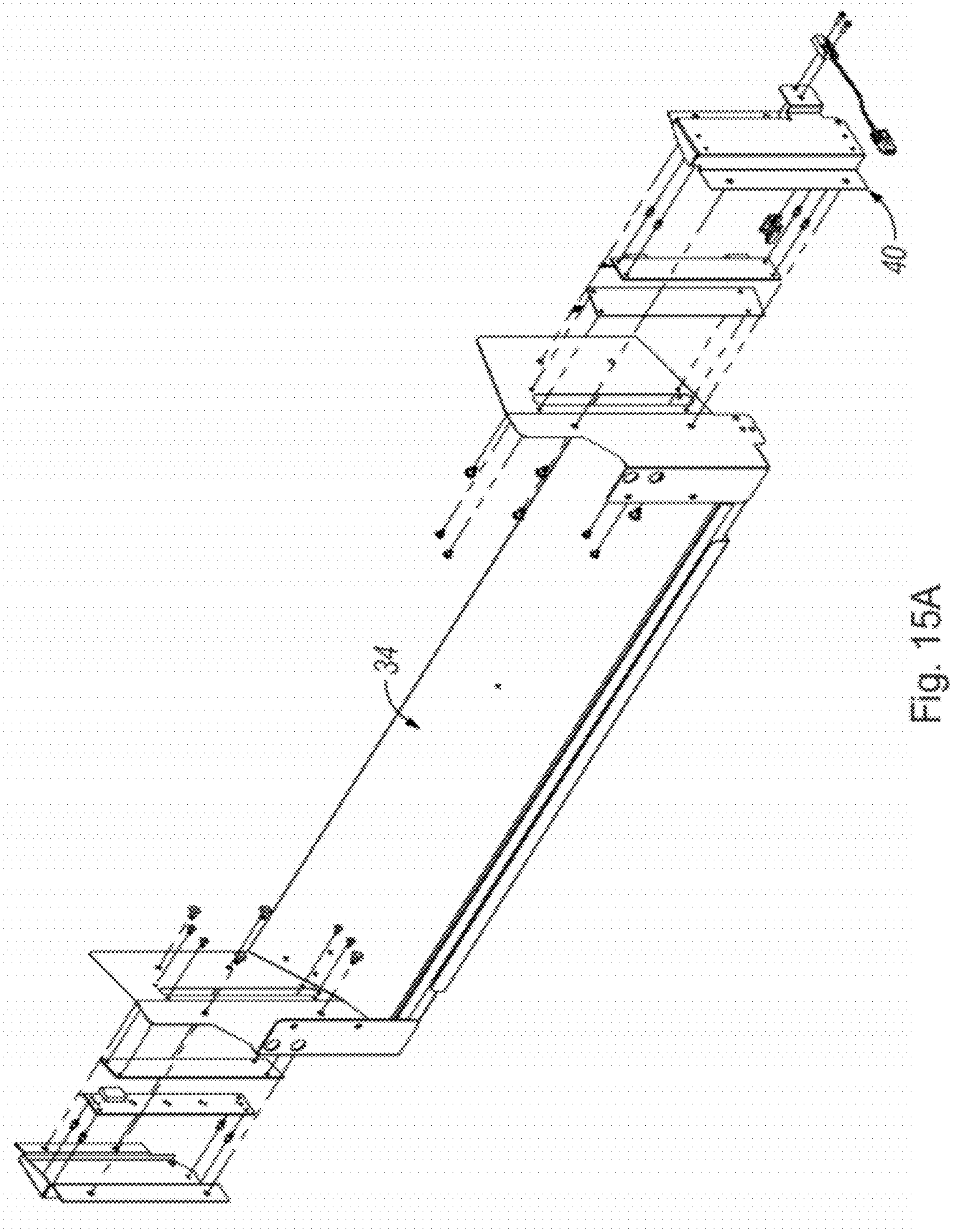
FIG. 15A is an enlarged isolated perspective view of the dispensing bin or elevator tray of FIGS. 1 to 11A and 11B, including an optical sensing vend confirmation system and the magnetic reed switch for shelf detection.
Figure 15B:
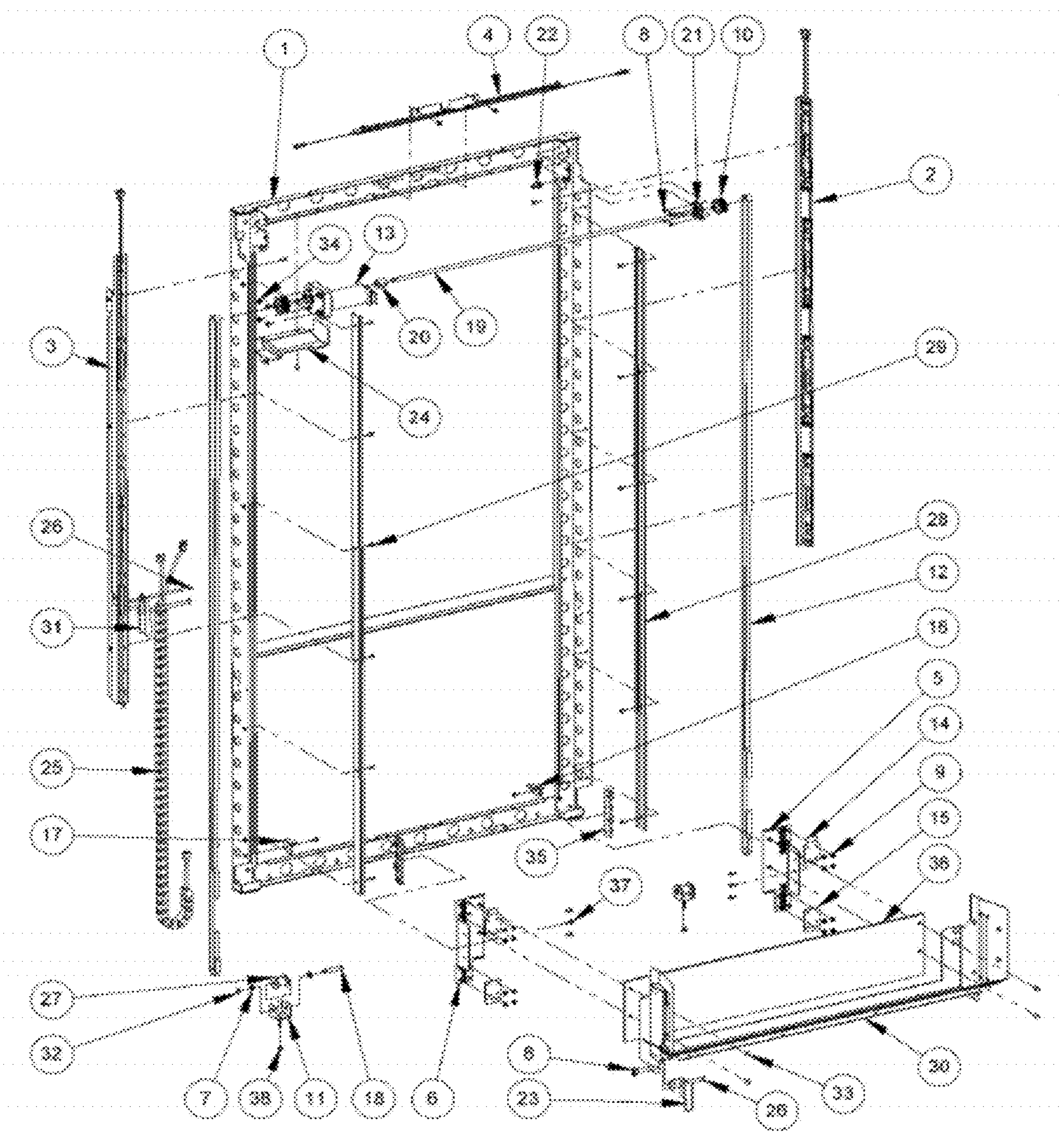
FIG. 15B is an exploded perspective view of one example of an elevator sub-assembly such as can be used with the embodiment of FIGS. 1 to 13.
Figure 15D:
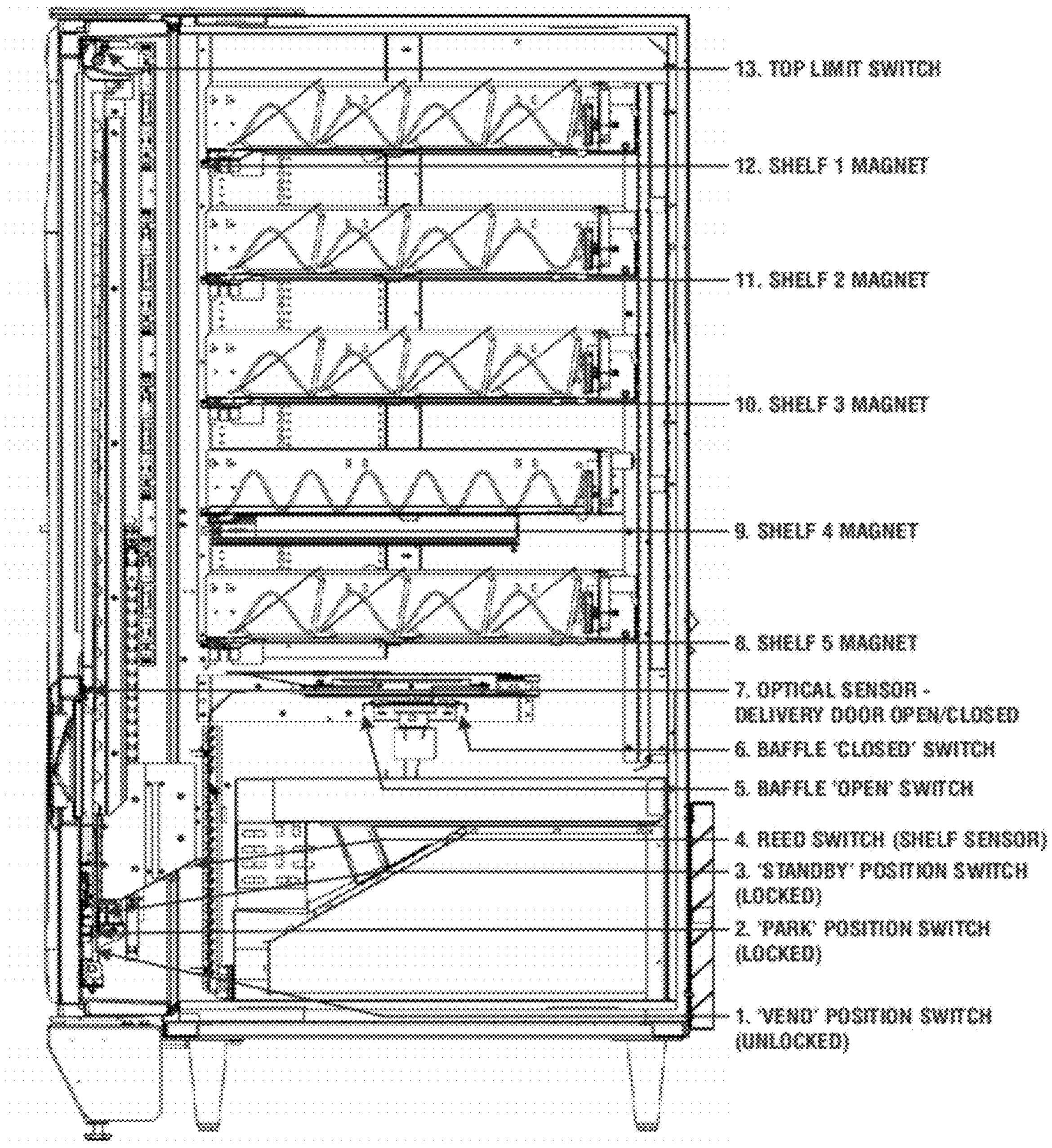
FIG. 15D is a sectional view in side elevation of the machine of FIG. 1, showing the elevator tray in-between "stand by" position and "product dispensing" position, and annotated to show the location of sensors and switches from the circuit of FIG. 13.
Figure 15E:
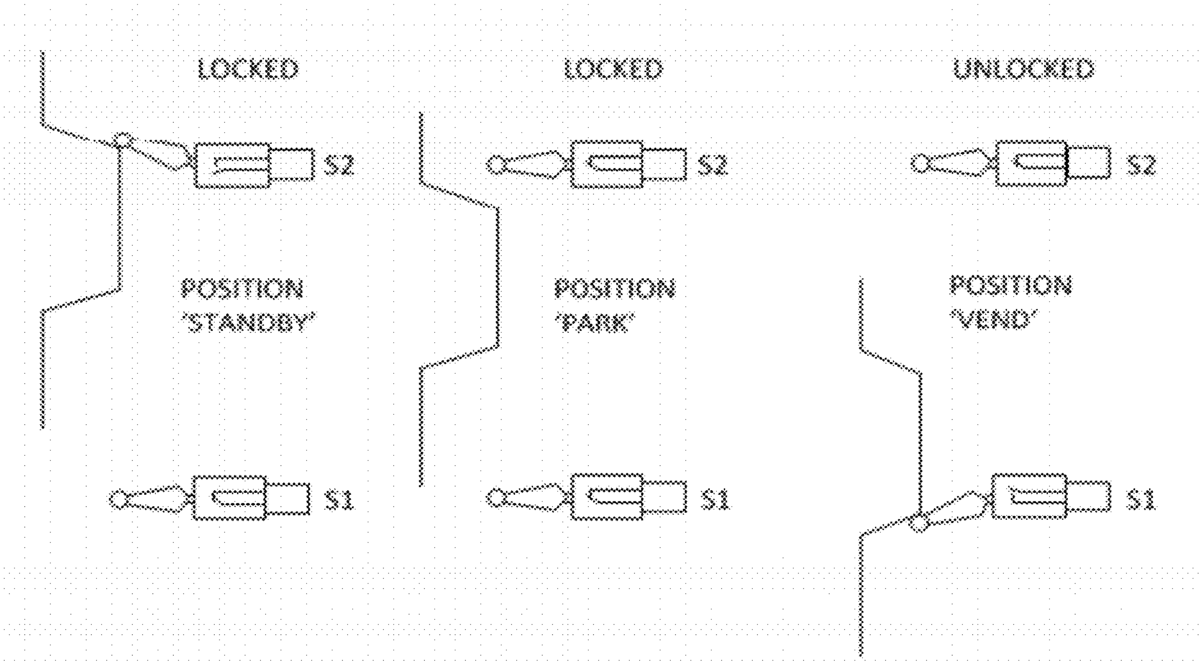
FIG. 15E is a diagrammatic depiction of a switching arrangement used in one method of operation of the machine of FIGS. 1 to 15A-C, in particular, to inform the machine of location of the elevator tray relative to "standby", "park", and "vend" positions which is used in the control and operation of the machine.
Figure 16A:
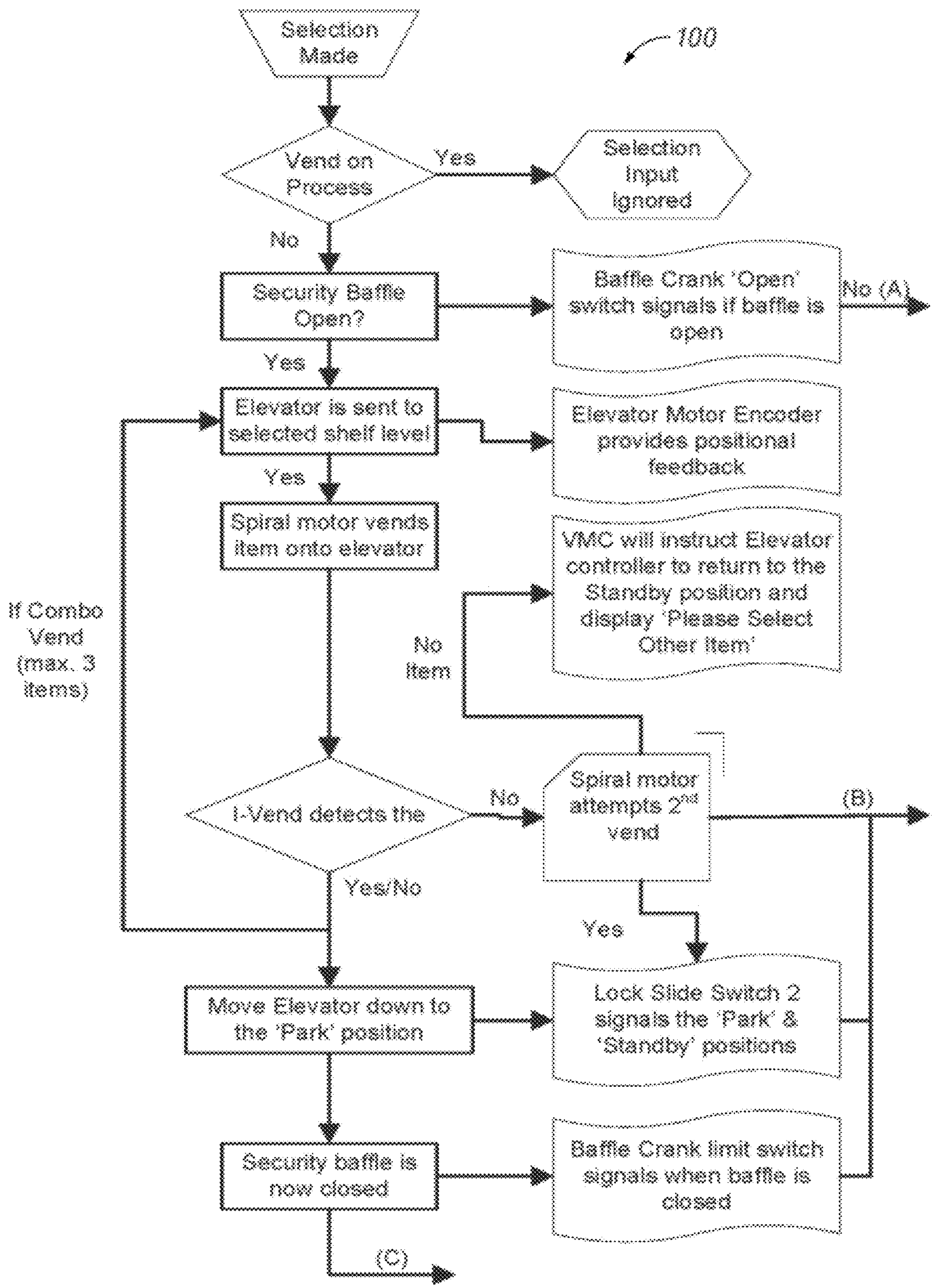
Figure 16B:
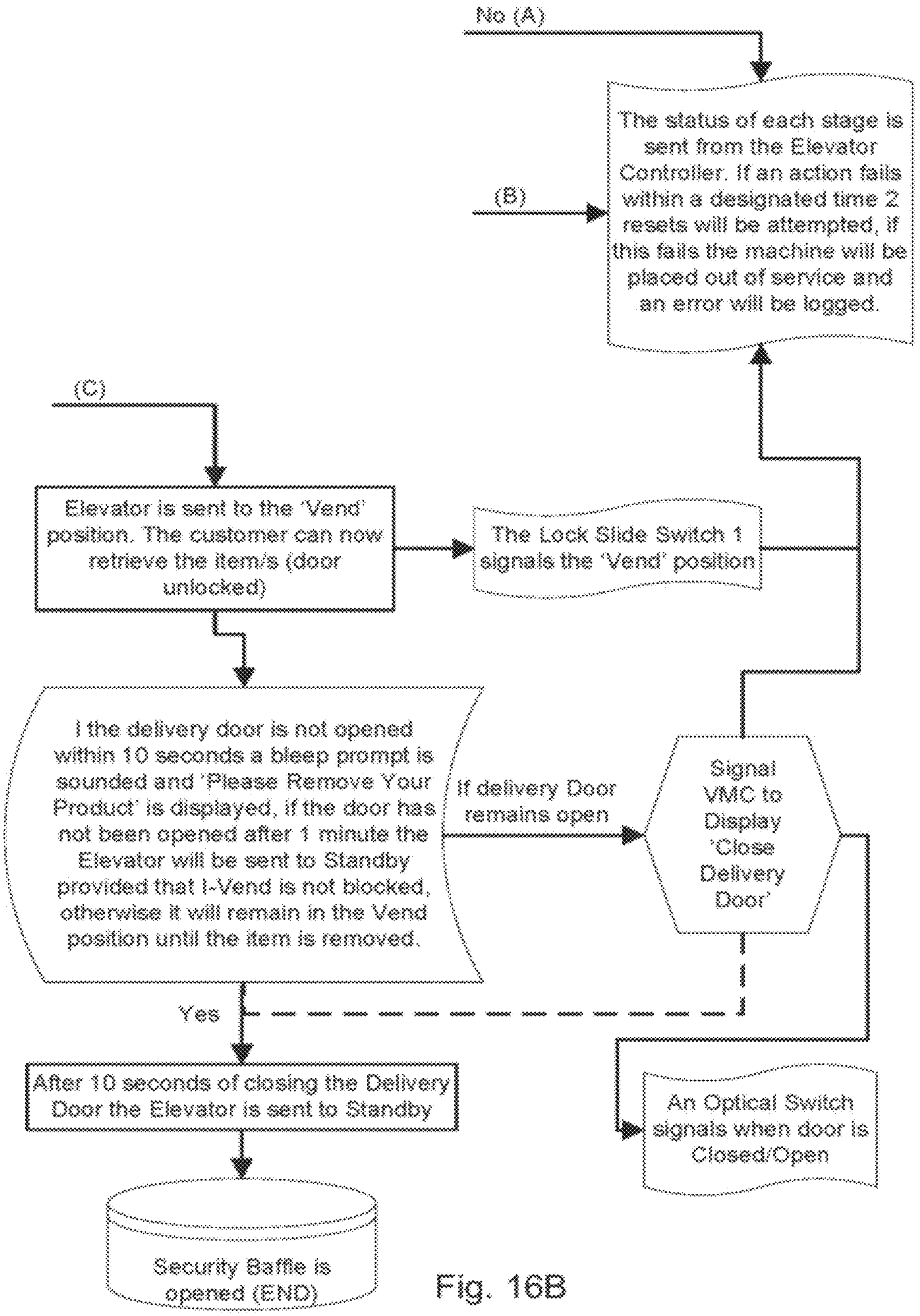

FIGS. 16A-B is a flow chart of operation of the machine and elevator sub-system of the embodiment of FIGS. 1 to 15A-D over a vend cycle.

IV. DETAILED DESCRIPTION OF EXEMPLARY EMBODIMENTS

A. Overview

For a better understanding of the invention, exemplary embodiments will be described below. The invention can take many forms and embodiments and this embodiment is but one way.

This embodiment will be discussed in the context of a vending or automated merchandising machine that includes an insulated cabinet and condenser/evaporator to maintain refrigerated or frozen food at appropriate temperatures, such as are well known in this technological field. The vending machine can also vend non-refrigerated foods or other products. This embodiment is also described in the context of plural helix-type dispensers, such as are well known in the technological field. It also has those dispensers arranged in multiple rows (shelves) and columns within the interior of the cabinet, with all dispensers dispensing inventory one-at-a-time forwardly towards a front, which comprises a main door to the cabinet with a glass window for customers to view the inventory. Examples of such vending machines and dispensers are disclosed at the following patents, which are incorporated by reference herein: U.S. Pat. Nos. 6,540,102; 6,772,906; and 7,565,222. However, at least aspects of the present invention can be applied in a variety of other contexts or types of vending machines and dispensers, as will be appreciated by those skilled in this technological field.

The embodiment is also in the context of an elevator sub-system or sub-assembly that moves an elevator tray (also sometimes referred to as a delivery bin) vertically past the dispensing ends of plural vertically-spaced levels or shelves 22 in the vending machine cabinet 12. One example of dimensions of cabinet 12 is 41.2 inches wide, 38 inches deep, and 72 inches high. However the concept can apply to a wide variety of machine sizes and configurations.

It is to be understood that aspects of the present invention can work with a variety of types of elevator trays, platforms or bins. Reference can be taken to the U.S. Pat. No. 6,247,610; US 2001/0000609; and U.S. Pat. No. 7,222,748 for ways in which a receptacle or bin could be moved vertically along vertically spaced dispensers in a vending machine by electric motors and associated components which could be controlled by a VMC or other programmable controller. The accompanying drawings and description give a specific example of vending machine 10 according the present invention. It utilizes a full width horizontal dispensing bin 34 of FIGS. 15A and B in combination with gearings and an electric motor to move bin 34 along vertical tracks (see FIGS. 1-11A/B). In this embodiment, most of the elevator components are installed on the inside of front door 16 of the vending machine cabinet 12 (see FIG. 15B). This allows the elevator tray 34 (see also FIGS. 15A and D) to move up and down in the elevator passage 26 between the dispensers and the front door 16. The specific construction and configuration of the elevator can vary according to need or design. Details are provided herein regarding the elevator and bin.

Others have tried the concept of a vertical elevator in a vending machine. Just a few examples include the following U.S. patents or published applications, which are incorporated by reference herein: U.S. Pat. No. 6,247,610; US 2001/0000609; and U.S. Pat. No. 7,222,748.

It is noted that one common type of elevator can be referred to as an "XY" picking elevator. It has a bucket or receiver sized for receipt and cradling of one dispensed product. It has to be controlled to move not only in a "Y" direction (vertically) to the correct horizontal plane, but also in an "X" direction on (horizontally) to the right horizontal position in that horizontal plane. Once the item enters that XY bucket, it must be moved to a dispensing location. This can be to another elevator (a separate sub-system to move it to customer access).

Therefore, room for improvement remains in this technical field.

B. Apparatus

Figure 13:
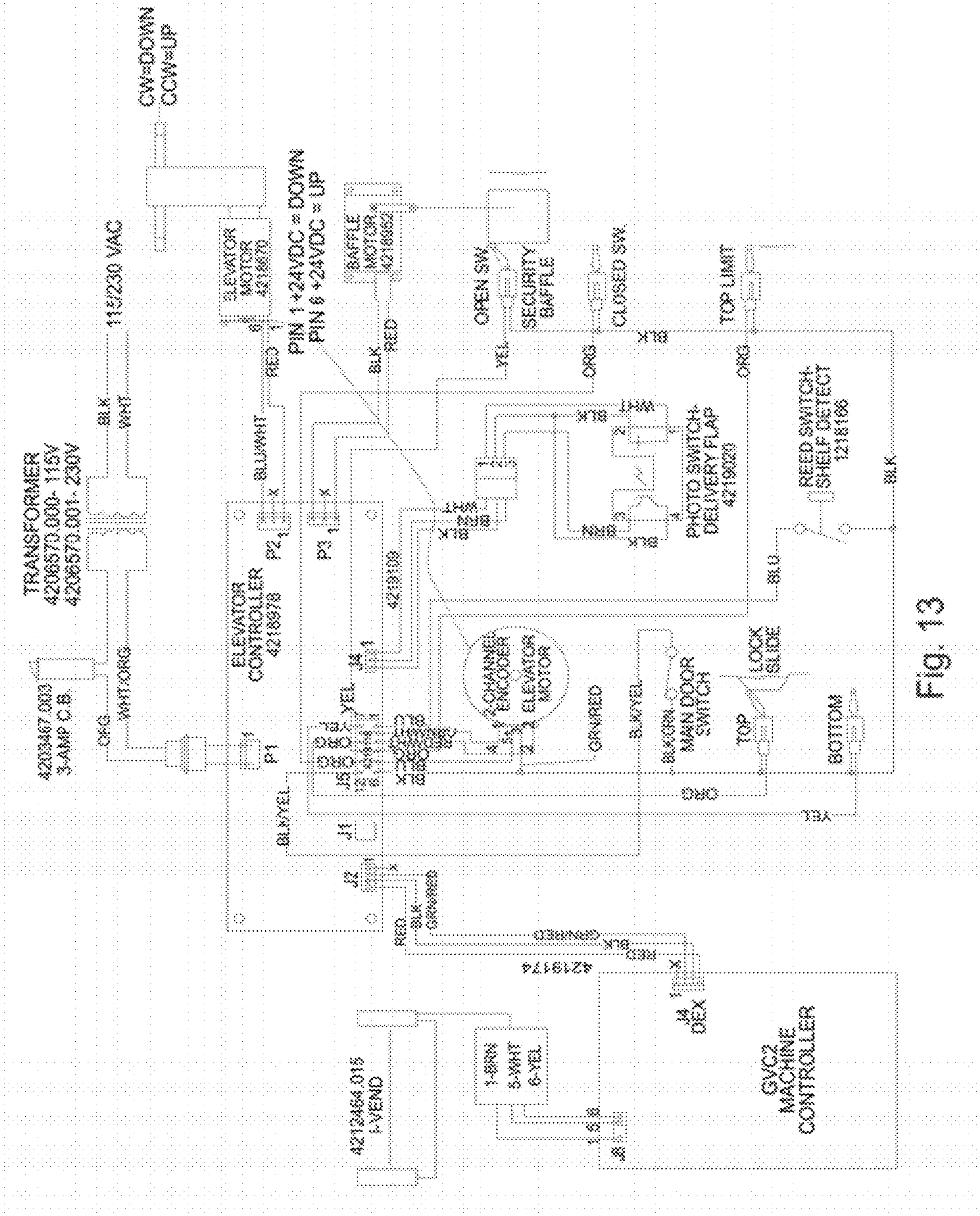
FIG. 13 is an electrical circuit schematic of the embodiment of FIG6FIG. 12.

By reference to the Figures, the specific components and structure of the embodiment of vending machine 10 can be seen. FIG. 12 shows the inter-relationship between hardware components of the elevator sub-system. FIG. 13 illustrates schematically an electrical circuit for the elevator sub-system.

FIGS. 1 to 11A and B focus on the main components. An elevator tray or dispensing bin 34 can be moved vertically along the front of the different shelves 22 of dispensers 24 in machine 10 by an elevator sub-assembly. This sub-assembly is illustrated in FIG. 15B. It basically conveys the elevator tray 34 on two vertical rails. Each side of elevator tray 34 is clamped or fixed along a belt that is looped between upper and lower pulleys. An electric motor 32 drives both top pulleys (in either rotational direction to drive the belts, which in turn raises or lowers elevator tray 34.

An access or delivery door or flap 18 blocks customer access to the interior of machine 10, when door 18 is closed. In this embodiment, door 18 is pivoted around a horizontal pivot axis along its top edge. It pivots inwardly. It can be locked against opening by a slide lock which slides upwardly from below the access to interference block inward pivoting of door 18. The slide lock can be moved down a distance outside of the swing path of door 18 to unlock door 18. The locking of door 18 prevents a customer from reaching inside machine 10 when the elevator is operating, or when no product is selected. It can be controlled to allow access only when machine 10 has confirmed a dispension of a product and moved elevator tray to a "vend" position at or below access door 18.

A security baffle 60 inside machine 10 can move between a retracted position out of the elevator passageway 16, and an actuated or extended position blocking the passageway. Security baffle can be actuated when access door 18 is unlocked as an "anti-cheat" feature, such as is known in the art. It blocks access to undispensed products still ready for sale in the machine 10.

Figure 3A:
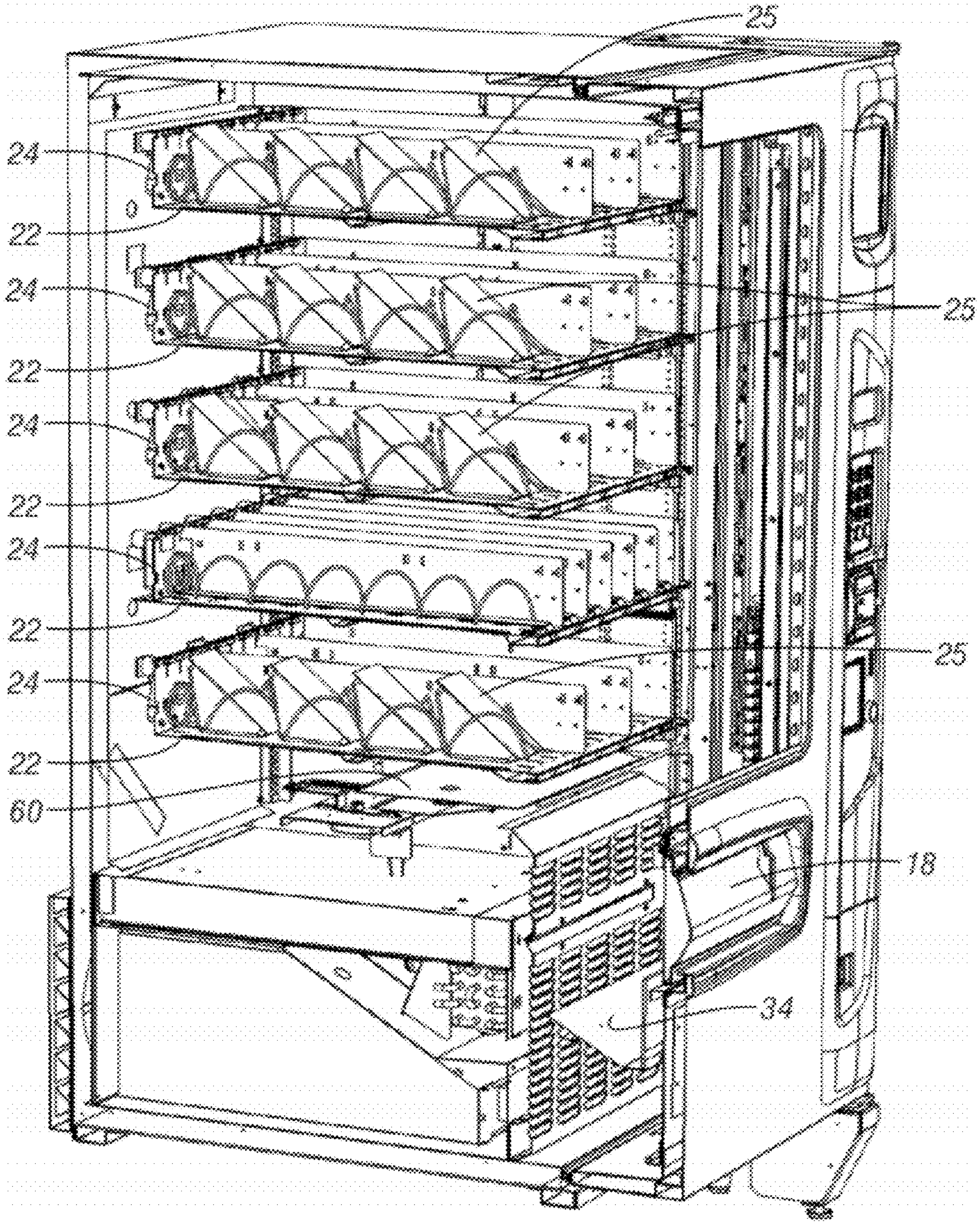
FIGS. 3A and 3B are perspective and side elevation sectional views, respectively, taken along line A-A of FIG. 1, illustrating the elevator tray in a "stand by" position below the lowest-most dispenser such as when waiting for a customer to make a selection.
Figure 3B:
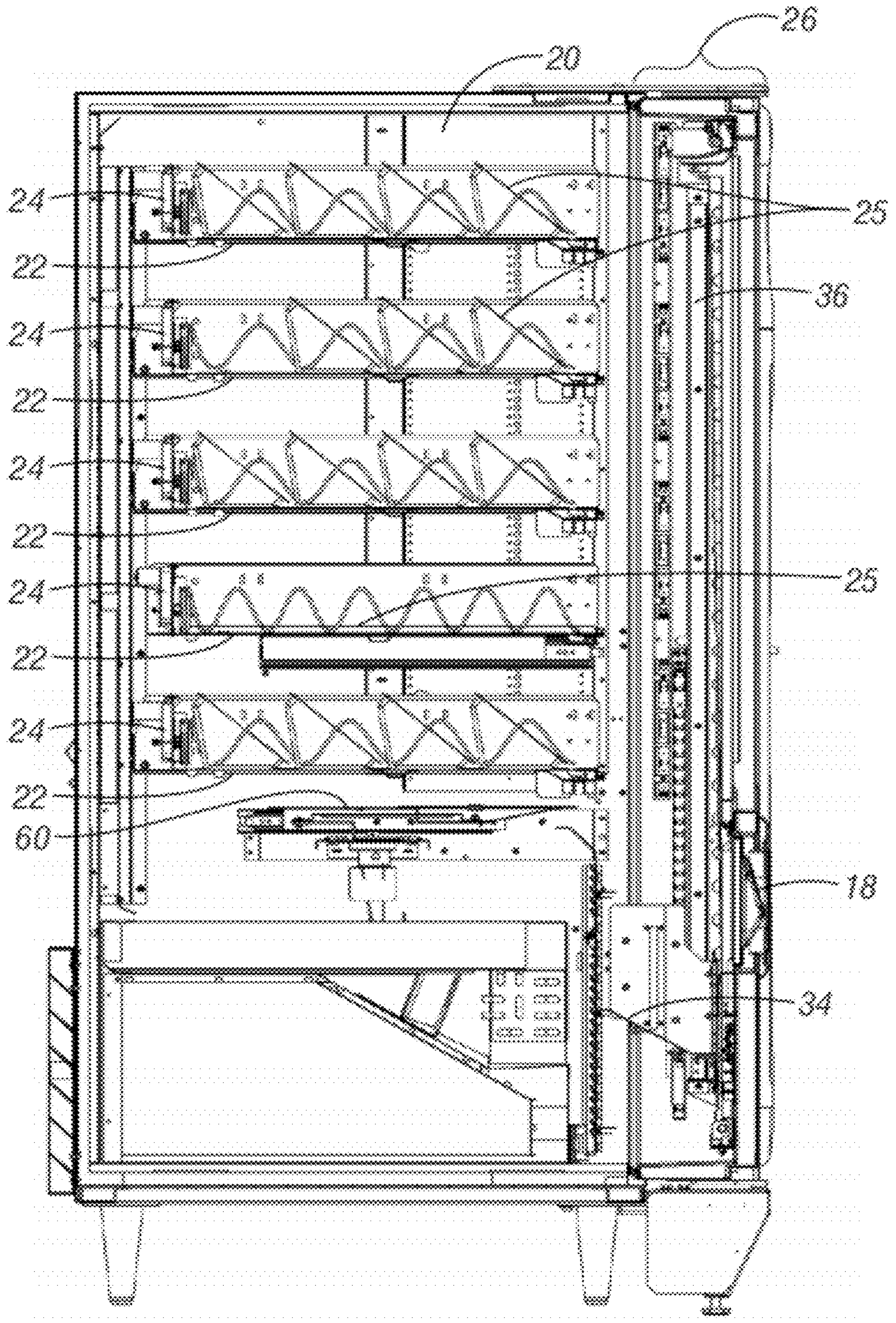
Figure 4A:
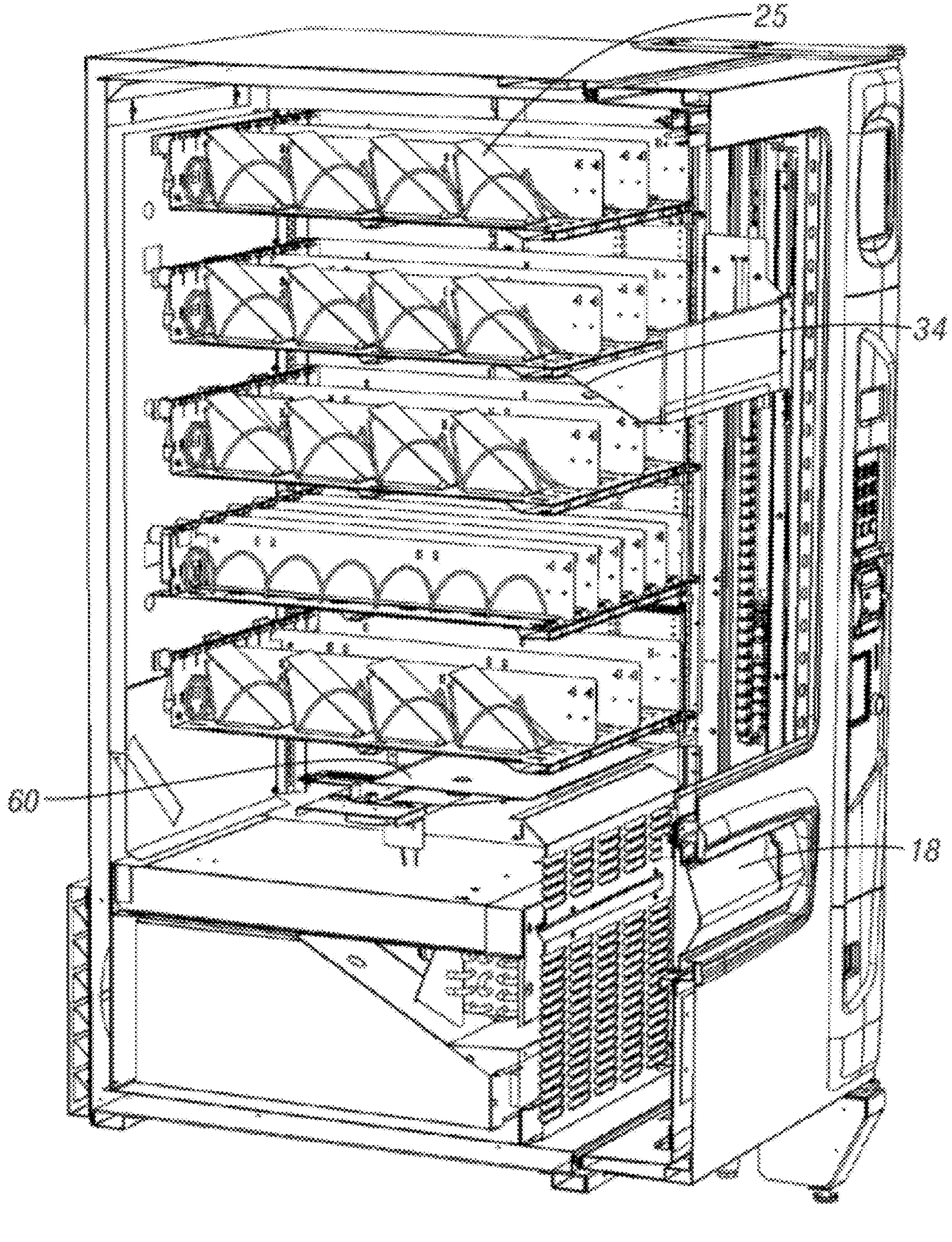
FIGS. 4A and 4B are perspective and side elevation sectional views like FIGS. 3A and 3B illustrating the elevator tray in a "product dispensing" position moved up to at or near the level of the shelf holding the selected product (in this example the second shelf from the top) and waiting for dispension of the product.
Figure 4B:
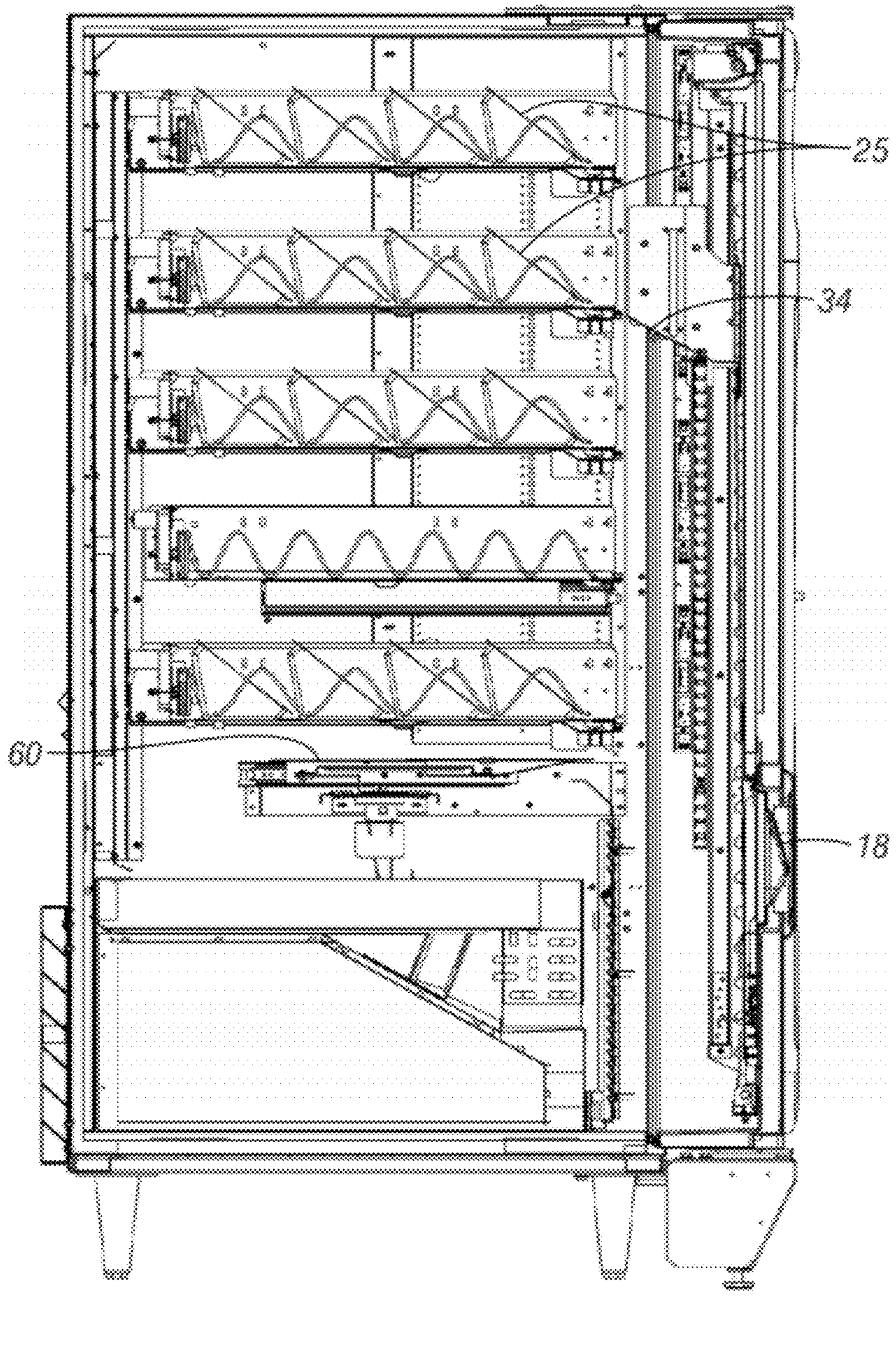
Figure 5A:
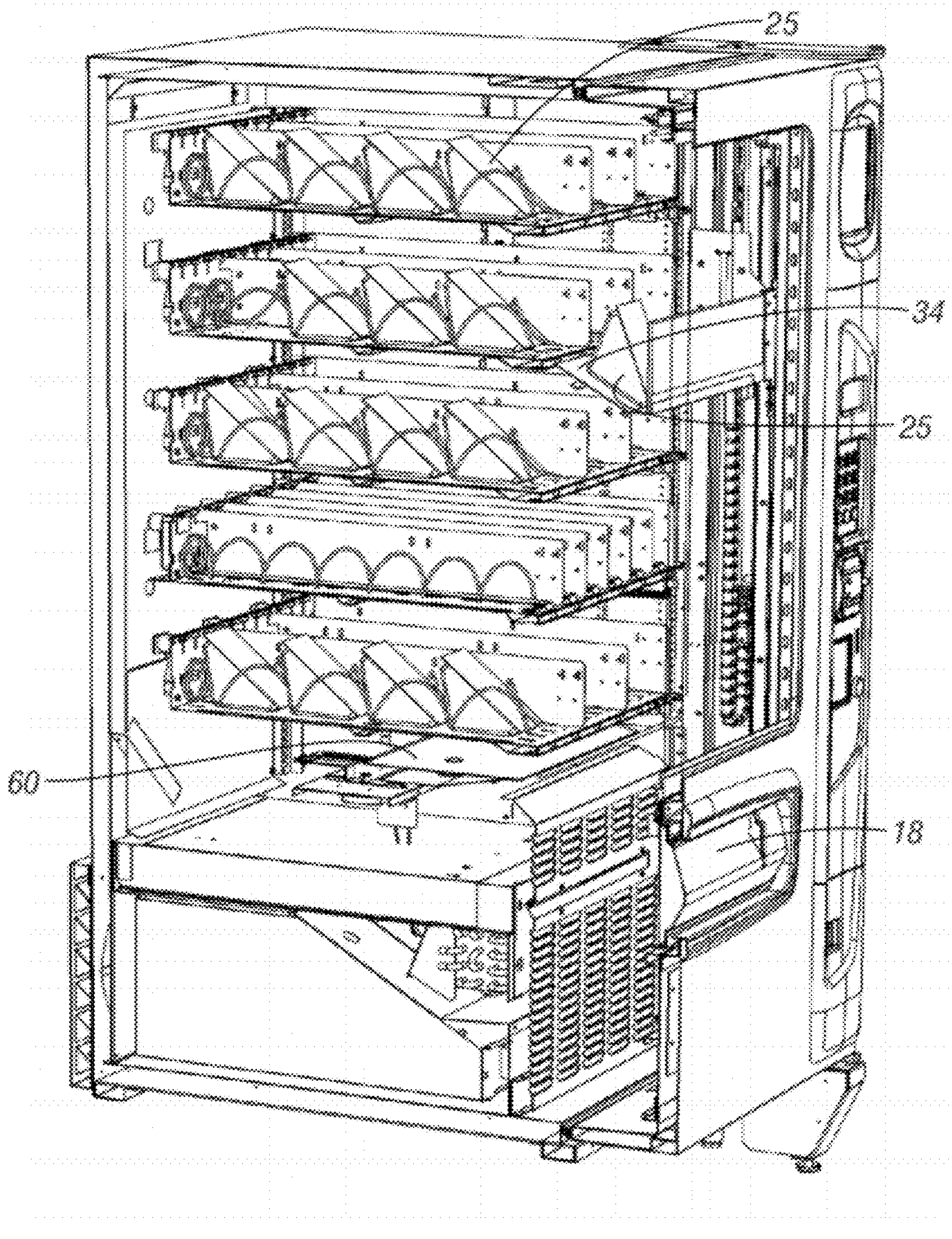
FIGS. 5A and 5B are similar to FIGS. 4A and 4B illustrating the elevator tray in the "product dispensing" position and with the customer's selection/s dispensed into the elevator tray.
Figure 5B:
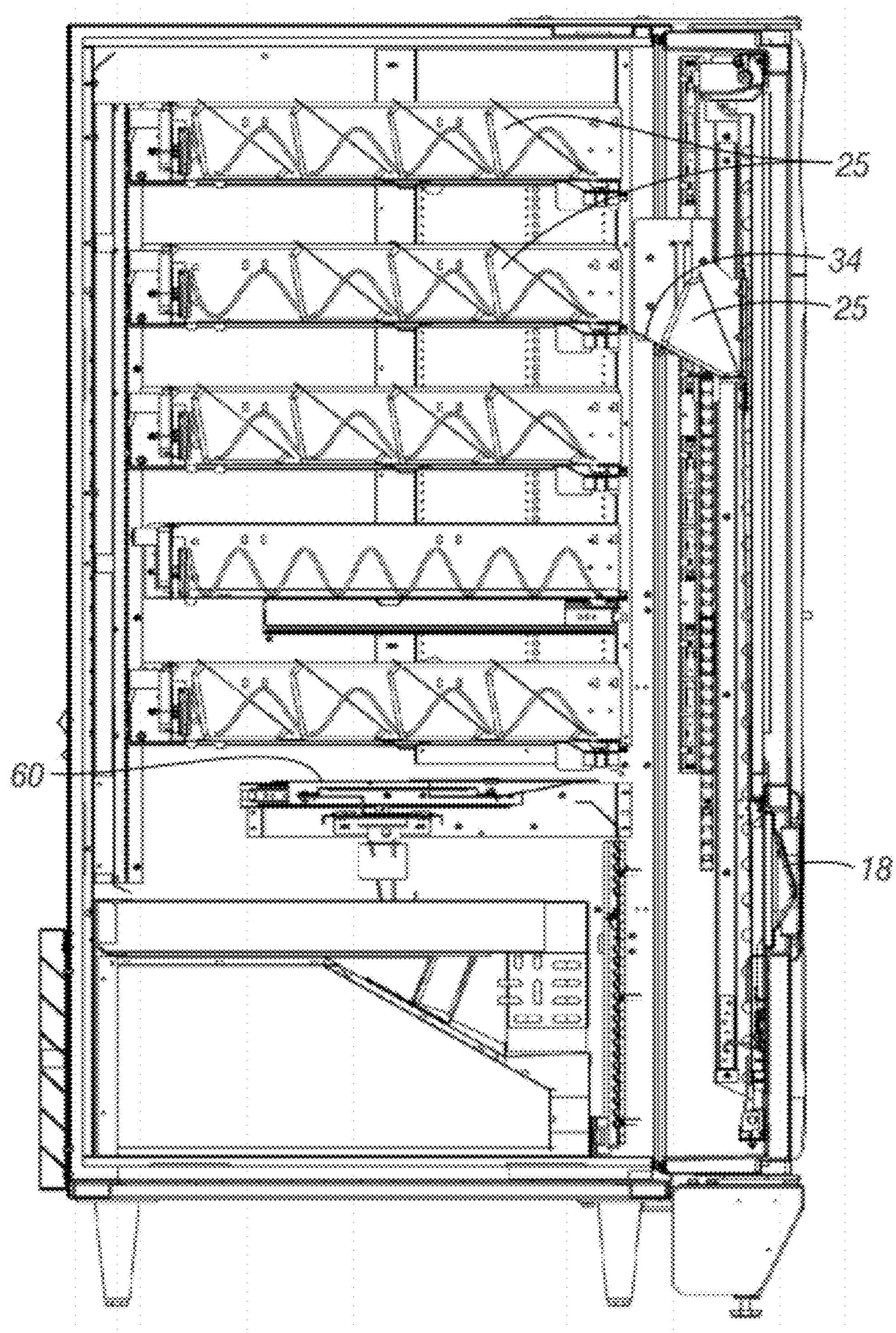
Figure 6A:
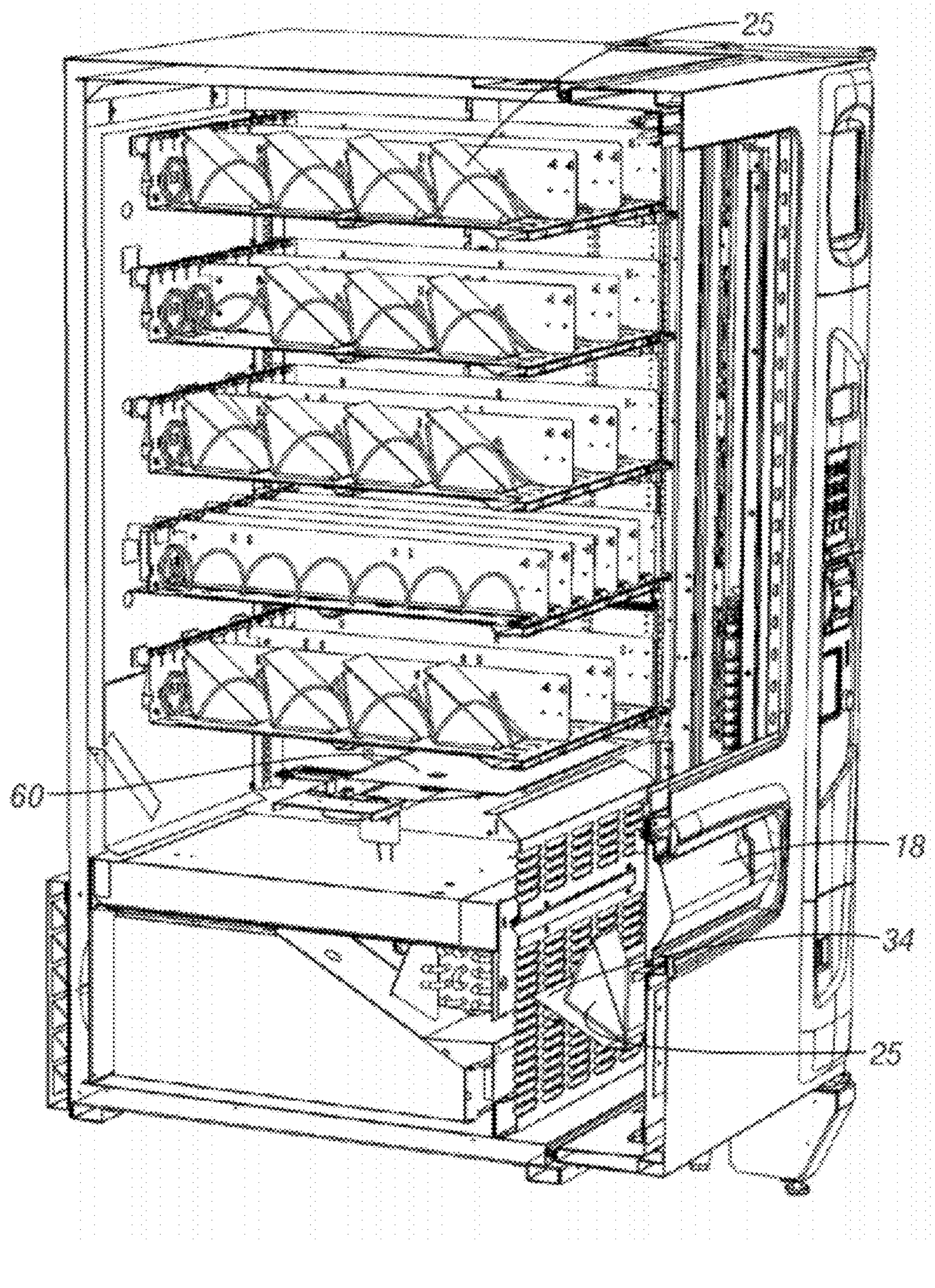
FIGS. 6A and 6B are perspective and side elevation sectional views like FIGS. 3A and 3B illustrating the elevator tray moved to a "park" position down close to the "standby" position (but slightly lower) in preparation for the product being presented to the customer.
Figure 6B:
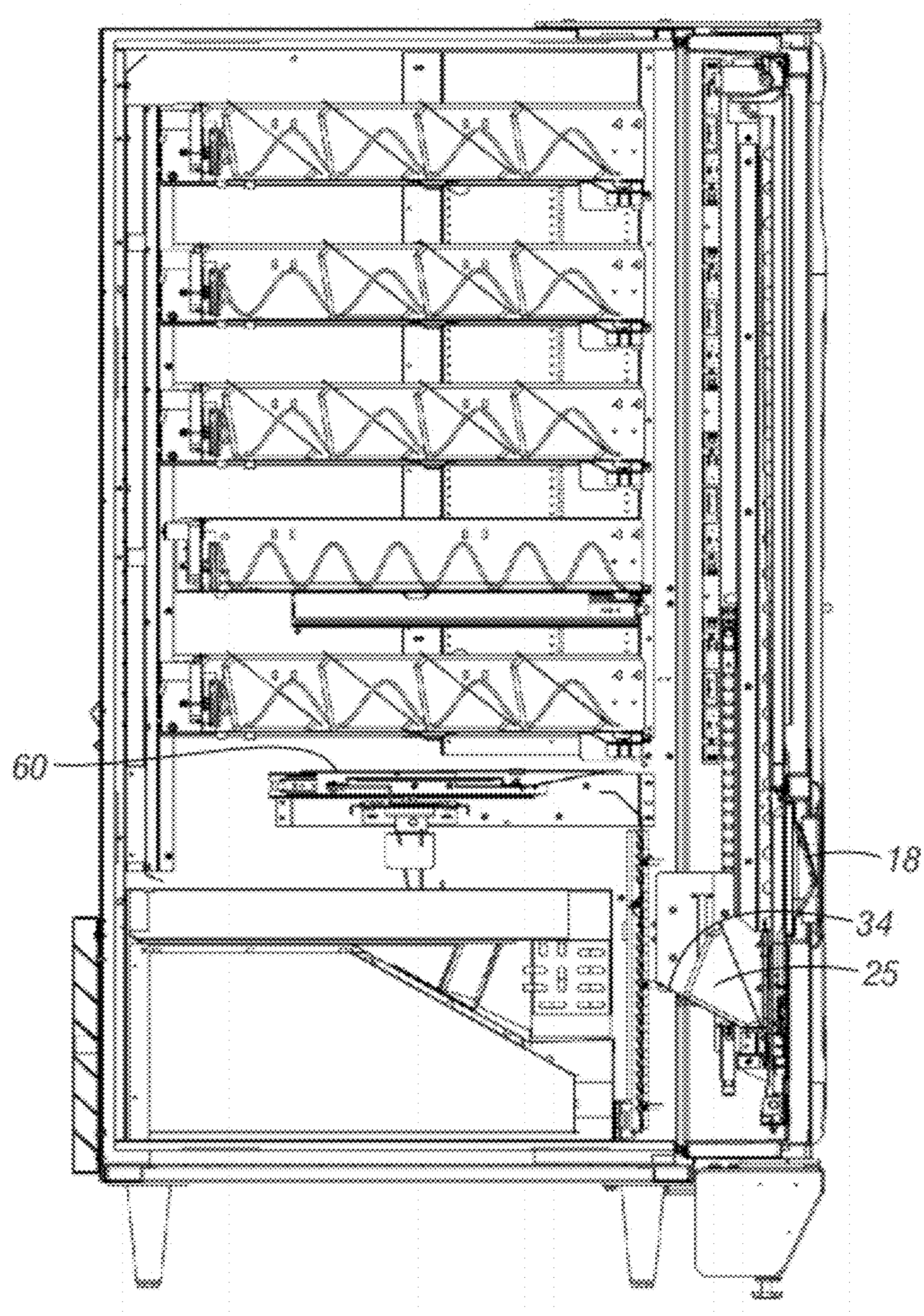

FIGS. 3A and B to 11A and B illustrate the positions and states of the various components to effectuate a vend of a customer-selected product. By reviewing those figures in order, it can be seen how elevator tray 34, access door 18, and security baffle cooperate or are coordinated in this embodiment. Further details are set forth below.

One exemplary embodiment of the invention, vending machine 10 (see FIG. 1), includes a cold food refrigerated vending machine cabinet body 12 with glass front door 16. Thus, a condenser and evaporator occupy a big part of the lower cabinet (behind storage door 28 of FIG. 2).

1. Customer Access Door

The customer-access door 18 (also sometimes called delivery or access door or flap 18) allows customers to reach inside machine 10 and retrieve a vended product. As can be seen in the Figures, delivery door 18 pivots around a horizontal axis at the top of door 18, and pivots inwardly to provide access through and down into delivery bin 34.

One main aspect of the exemplary embodiment is to use an elevator system 30 to move an elevator tray 34 (see also enlarged view at FIG. 15A) up to a shelf 22 of a product to be dispensed, receive and confirm the dispensing with a sensing system 40, and then bring the dispensed product 25 (e.g. pre-packaged refrigerated food) down to the customer at delivery door 18. In the drawing, vendible products 25 are all depicted as a triangular shape (in the form of a typical wrapped, refrigerated sandwich), to distinguish products 25 from the machine structures. However, it is to be understood that a wide variety of products (food and non-food) can be vendible products for purposes of the invention and this embodiment, as is well-understood by those skilled in the art. The figures and description below describe one way these functions can be performed. As mentioned previously, the vertical movement of the elevator tray 34 can be in a variety of ways. The drawings show one example.

2. Elevator

A welded rectangular frame (see FIGS. 15B and C) essentially around the window of door 16 supports the elevator subsystem which comprises the following combination:

The sheet metal delivery elevator tray 34 (alternatively called the delivery bin) can be raised and lowered in the frame by an electrical motor and drive components. See FIG. 15A for an enlarged view of just the sheet metal bin 34. In final assembled form, tray 34 includes the optical product dispense sensor 40, see FIG. 13. Details of how sensor 40 operates can be found in U.S. Pat. No. 7,565,222, incorporated by reference herein, except that in this embodiment, the rows of emitters and detectors are in a vertical orientation, basically in a plane generally parallel or in a similar direction as a vertical plane across the fronts of the dispensers 24 on the plural vertical shelves in machine 10. Sensor 40 detects when a product is successfully dispensed onto the floor of elevator tray 34 when in the "vend" position. Tray 34 also carriers another sensor, namely shelf detect sensor 72, see FIG. 13. Shelf sensor 72 is located on the side of bin 34 and detects the shelf position indicators or markers that are adjacent to each shelf 22.

FIGS. 15B and C provides details of one form the elevator sub-assembly can take. Below are details of its configuration. Reference to specific parts in FIG. 15B in the immediately following description will use the circled part numbers on FIG. 15B, which correspond to the parts list in FIG. 15C.

Elevator motor 32 (FIG. 15B, circled part #13) (DC motor, 220 rpm) and a gearbox are mounted at the top of the frame (FIG. 15B, circled part #1) with a drive pulley fixed to one side ($2\times 5/64$ inch Hex Set Screws) of the output shaft of the motor together with an integrated dual magnetic encoder which senses speed and direction of the output shaft of the motor.

A drive axle (FIG. 15B, circled part #19), one end of which is fixed to the elevator motor output shaft with a coupler ($2\times 3/32$ inch Hex Set Screws), the other end has the other drive pulley (FIG. 15B, circled part #10) affixed to it. The drive axle extends across the top of frame.

A pair of notched belts (FIG. 15B, circled part #12) loop around the drive pulleys at the top of the frame. The belts extend down to open gaps at which opposite sides of elevator tray or bin (FIG. 15B, circled part #30) is affixed. The belts are looped around non-driven pulleys at the bottom of the elevator frame. The electric motor and gearing drive the drive pulleys to drive the belts in either direction. The pair of plain pulleys (FIG. 15B, circled part #27), one either side at the bottom or base of the frame allow tension of the belts to be adjusted by means of a No. 8 nyloc nut ($11/32$ inch wrench) on the underside of each pulley mount. Each endless notched belt is thus operatively positioned and tensioned around (a) a drive pulley which is driven by rotation of the drive axle by rotation of the output shaft of elevator motor and (b) a plain or non-driven pulley which is rotatably fixed to a side of the elevator bin or tray (FIG. 15B, circled part #30).

A set of vertical rails (FIG. 15B, circled part #28) with channels are mounted along each lateral side of the frame. Runners or wheeled carriages (FIG. 15B, circled part #35) mounted to opposite lateral sides of the elevator tray are captured in the channels of the rails, and allow a low friction way to move the elevator tray up and down the rails in reaction to movement of the belts on the pulley sets.

A top limit detector switch can be positioned on the frame. Each time the main door of the vending machine is closed, the elevator sub-system can go through an initializing routine. An elevator controller can operate the motor to raise the elevator tray towards the top of the elevator frame until it actuates the top limit switch at the top if its travel. When the switch is actuated the motor immediate stops and reverses into a downward direction.

In this example, the notched belts (FIG. 15B, circled part #12) are each 10 ft. long and open (the open section is shown at FIG. 15B at the front/bottom end of the belts). The belts are tied together at the elevator tray. The belts are clamped/anchored into complimentary notches on brackets (FIG. 15B, circled part #5), each being retained by 4×#6 nuts. The brackets also provide the mounting/securing means for the elevator bucket itself by way of 4×#8 nuts (FIG. 15B, circled part #33).

Referring now to other figures, an encoder 80, such as is known in the art and commercially available, can communicate with a complimentary motor controller (EC) 90 the speed and direction of elevator tray 34 based on the encoder output (after proper calibration). EC 90 can communicate with the overall vending machine controller (VMC) 92 so that VMC 92 is always informed of the vertical location of bin 34 relative to a home or reference position.

A second position sensing technique can also be used. Elevator tray 34 can carry a sensor that detects an indicator, marker or other item along the vertical rise of vending machine 10. One example is magnets at each shelf 22 level. Another would be some type of contact with structure at each shelf level (e.g. a contact switch that would run into and close an electrical switch when it hits each shelf 22). Other methods are possible. This would allow an alternative or additional way to electrically inform VMC 92 that a shelf 22 has been reached. These different proximity sensing methods are commercially available and well known to those skilled in the art. EC 90 or VMC 92 can be programmed to distinguish or know which shelf 22 corresponds to what sensing. For example, it could be programmed to know that a first switching or sensing by of a magnet after movement of bin 34 away from the stand-by position indicates the lowest most shelf 22; the second switching or sensing of a magnet indicates presence or proximity to the next to lowest shelf 22, and so on up to the top shelf 22 (or until a top-most limit switch is tripped). Having two ways to sense bin vertical position can assist in beneficial operation of the system.

3. Security Baffle

As mentioned, security baffle 60 is located in cabinet 12 under the lowermost tray 22 and above the refrigeration module. In principle security baffle 60 replaces the traditional "anti-theft" flap found in most delivery boxes. Vended items are retrieved directly from the bin 34, but to prevent additional items being knocked of trays 22 using wires/sticks, etc. without paying for them, baffle 60 closes off access to the cabinet 12 space prior to delivery door 18 being unlocked. Note that in refrigerated machines 10, to provide free airflow to facilitate good refrigeration performance, security baffle 60 remains open while machine 10 is in standby sales mode.

Several features are possible with the baffle 60. For example, baffle 60 can always be in the "closed" or blocking position with delivery door 18 is unlocked. Baffle 60 can remain closed until delivery door 18 has been locked, which can occur by virtue of the elevator tray or bin being moved to the "standby" position.

4. Delivery Door Lock Slide

As mentioned, a sliding lock can be used to lock access or delivery door 18 from being pivoted open until the elevator tray 34 is in a certain position. Lock slide 52 performs these functions:

(a) Locks/unlocks the delivery door or flap 18.

(b) Operates detector switch 1 (bottom or lower switch in FIG. 13 and switch S2 in FIG. 15E).

(c) Operates detector switch 2 (top or upper switch in FIG. 13 and switch S1 in FIG. 15E).

In this embodiment, lock slide 52 is operated by bin 34. It is basically an L-shaped rigid metal bolt member held in a bracket attached to the inner side of vending machine front door 16 and under the opening for access door 18. A first arm of the L-shape is parallel with door 16. The other arm extends outwardly from the plane of door 16 a distance such that it is in the path of travel of the bottom of elevator tray 34. Its lower or retracted position is such that the first arm is below the swing path of access door 18. Its extended or raised position has the first arm up into that swing path. Thus, like a bolt on a door, when in extended position it mechanically blocks the inward opening of door 18.

An extension spring ensures lock slide 52 is normally urged to the extended or raised position (pulled up to locked position). In this embodiment, lock slide is positioned relative to the travel of elevator tray 34 such that when tray 34 moves downward far enough, its bottom engages the outward extending other arm of the L-shaped bolt of lock slide 52 and has sufficient force to overcome the extension spring and move slide lock from an extended or locked position to a retracted or unlocked position. This allows door 18 to swing open. The extension spring returns the slide lock to the upper position, locking door 18, if it is not being pressed down by the underside of bin 34.

FIGS. 13 and 15D and E provide more details about the operation of lock slide 52. It can be coordinated with two limit switches to provide three states (see FIG. 15E). This allows the locking and unlocking of access door 18 according to the example of operation set forth in FIG. 16, and described further below.

Specifically, by referring to FIG. 15E, two spaced apart switches 51 (bottom) and S2 (top) are mounted near lock slide 52. The range of vertical travel of lock slide is in the order of 1½ inches. A projection from lock slide 52 (the trapezoidal shape in FIG. 15E) is positioned between switches S1 and S2 (which are approximately spaced apart the range of travel of slide lock 52). When lock slide is free of elevator tray 34 (as in "standby" position"), the extension spring pulls lock slide 52 up to the point where the projection actuates switch S2. If elevator tray 34 is moved to the slightly lower "park" position, the projection is in-between and free of both switches S2 and S1. If tray 34 is moved to "vend" position (even lower than "park"), the projection actuates switch S1. Therefore, as shown in FIG. 15E, this allows three logical states that can be communicated to the elevator controller EC and/or vending machine controller VMC, which can then know the state of slide lock 52 (locked or unlocked). Note particularly that the three vertical positions of slide lock 52 provides three different electrical switch states, but that slide lock has only two mechanical states, locked and unlocked, which is controlled by the position of the bottom of elevator 34.

With reference to FIG. 15E. below is another way to summarize operation of the lock slide.

The Vend Sequence

Note: There are 3 logical states to support the vend sequence:

a) VEND—the Delivery Door is unlocked to allow vended items to be retrieved.
b) PARK—is used when the elevator is traveling in a downward direction, this position allows the security baffle to be closed prior to moving down the 'vend' position and unlocking the delivery door flap.
c) STANDBY—is used when the elevator is traveling in an upward direction, the delivery door flap is locked and the security baffle can be opened.

1. A valid selection code is made with the required credit.
2. Selection code is sent to motor controller.
3. Elevator is driven up to desired shelf.
4. Product is vended onto elevator tray (seen by I-vend).
5. VMC controller communicates to proceed to 'Vend' position.
6. Elevator is driven down to the. 'Park' position and stops.
7. Security Baffle is driven to the 'Closed' position.
8. Elevator is then driven down to the 'Vend' position and the delivery door is unlocked.
9. Elevator will remain in the 'Vend' position for up to 1 minute until the Delivery Door is opened/closed.
10. Elevator is then driven up to the 'Standby' position and the Security Baffle is opened.

5. Delivery Door Optical Sensor

This safety sensor 54 is located above the hinge of delivery door 18 nearest to the payment system/s. An actuator plate is attached to door 18 itself and blocks an optical light path when door 18 is opened approximately ¼ inch. At any time delivery door 18 is open none of the elevator moving parts will operate.

The delivery door 18 is monitored during the vend cycle to determine whether it has been opened/closed. If it is left open for any reason a message will appear on the user display prompting the door to be closed. If an attempt is made to cheat the door, the security baffle 60 will immediately be closed and the elevator tray or bin 34 will be sent to the "vend" (delivery door unlocked position.

Should the delivery door 18 be cheated/opened while a vend is in progress, the system will be rendered out of service and error code will be reported when entering service mode.

Reference can be taken to the drawings for additional details about the exemplary embodiment 10.

C. Operation

Operation of the apparatus of vending machine 10 can be seen by reference to the Figures. FIG. 16 provides a flow chart of operation of a vend cycle for machine 10.

FIGS. 1-11 provide a high level illustration of the exemplary embodiment 10. They show how the elevator system 30 includes the raisable and lowerable delivery bin 34, which can sit in a "stand by-ready to vend" position" near the delivery door 18 of cabinet 12 (sec FIGS. 3A and B). The elevator bin 34 is raised and lowered on vertical rails 36 on opposite interior sides of main door 16 by an electric elevator motor 32 controlled by an elevator controller or EC 90. A door lock slider 52 (physically actuated by the underside of elevator bin 34) is maintained in locked position by EC 90. Thus no one can open delivery door 18 when machine 10 is in this status. EC 90, motor 32 and its encoder 80, shelf sensors 70/72, and the other components are commercially available and the installation and configuration (and calibration if needed) are within the skill of those skilled in the art with reference to the information in FIGS. 12-16 and this description.

In this example, an indicator or marker is mounted at each tray 22 in correspondence with the vertical travel of reed switch-shelf detect sensor 72, which is mounted on elevator tray 34. In one example, a permanent magnet would be mounted on each shelf 22. Sensor 72 is basically a proximity detector of such a magnet and triggers an electrical signal upon sensing a magnet within its pre-set range of sensitivity. This allows a way to positively sense the location of a shelf 22. Such proximity sensors are commercially available. A reed switch is an electrical switch operated by an applied magnetic field. It consists of a pair of contacts on ferrous metal reeds in a hermetically sealed glass envelope. The contacts may be normally open, closing when a magnetic field is present, or normally closed and opening when a magnetic field is applied. The switch may be actuated by bringing a magnet near to the switch. Once the magnet is pulled away from the switch, the reed switch will go back to its original position. Sensitivity, the amount of magnetic field necessary to actuate it, is measured in units of Ampere-turns, corresponding to the current in a coil multiplied by the number of turns. Typical pull-in sensitivities for commercial devices are in the 10 to 60 AT range. The lower the AT, the more sensitive the reed switch. Also, smaller reed switches, which have smaller parts, are more sensitive to magnetic fields, so the smaller the reed switch's glass envelope is, the more sensitive it is. In this example, the sensitivity can be empirically developed for the particular machine. A discussion of the principles of reed switches as proximity sensors for magnets can be found at U.S. Pat. No. 3,283,273, which is incorporated by reference herein.

As a general rule, the magnets on trays 22 are aligned with the center of the tray base or shelf 22 base. But the magnets can be offset a bit. One example is in the case of vending cans or bottles, as opposed to food or snacks. In the latter case the magnet is at the center of the shelf 22 base because the snacks slid directly in the plane of the shelf and out to tray 34. In the former, the magnet might be approximately ½ inch above the centerline of the shelf base in cases where the dispenser raises the can or bottle about ½ before it drops to tray 34. Optionally, the magnet could be on a telescopic slide that could be adjusted easily depending on the product. Adjustability of magnet position provides for flexibility and versatility. It is to be appreciated that other forms of sensing shelf location are possible. A few examples would be mechanical contact switches or optical switches. One example of an optical switch would be to place reflective tape at each shelf level. An optical sensor could sense reflected light from the reflective tape.

Figure 1:
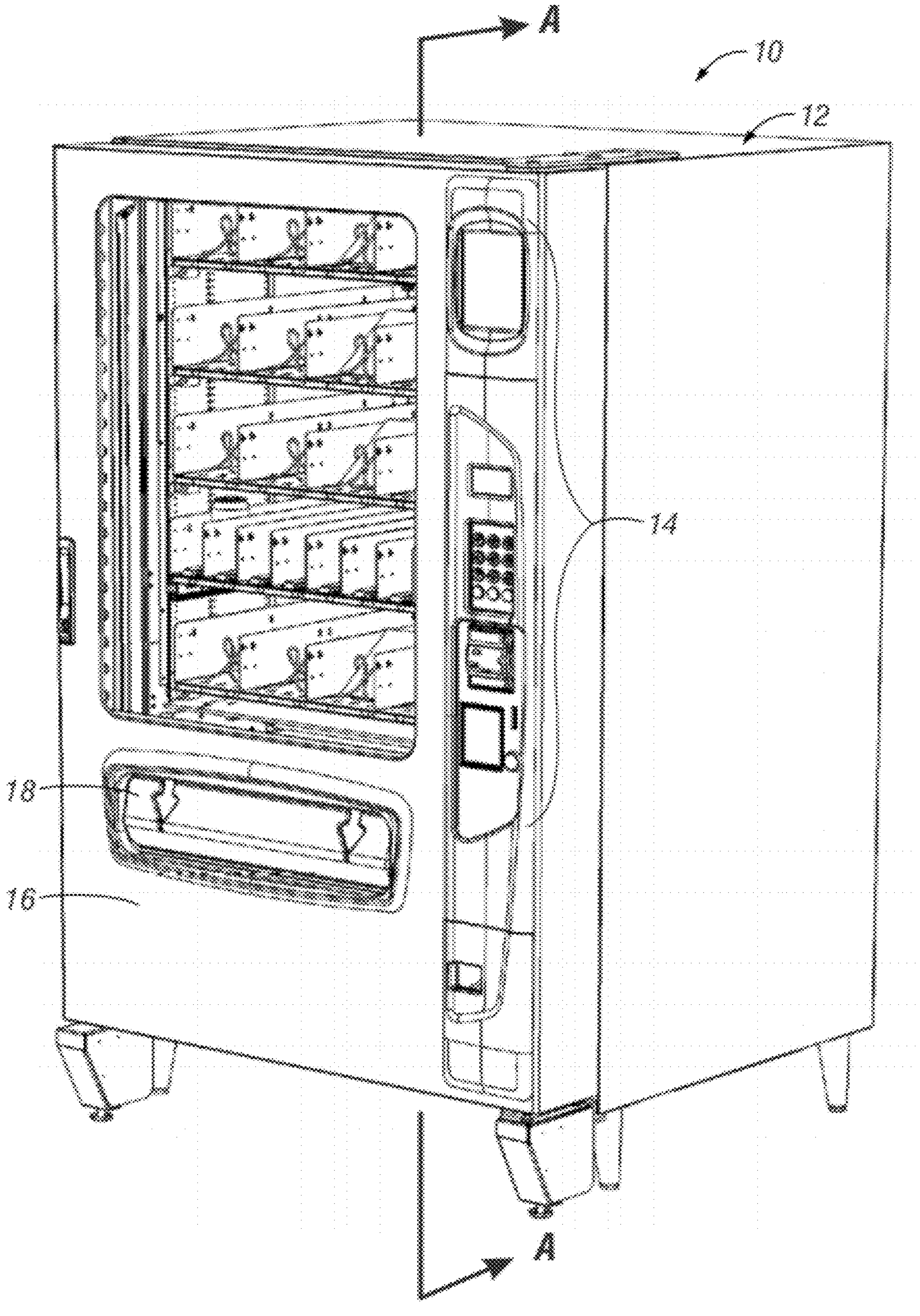
FIG. 1 is a perspective view of a vending machine according to one exemplary embodiment of the invention, having an internal elevator sub-assembly that moves an elevator tray vertically past product dispensers in the machine.
Figure 2A:
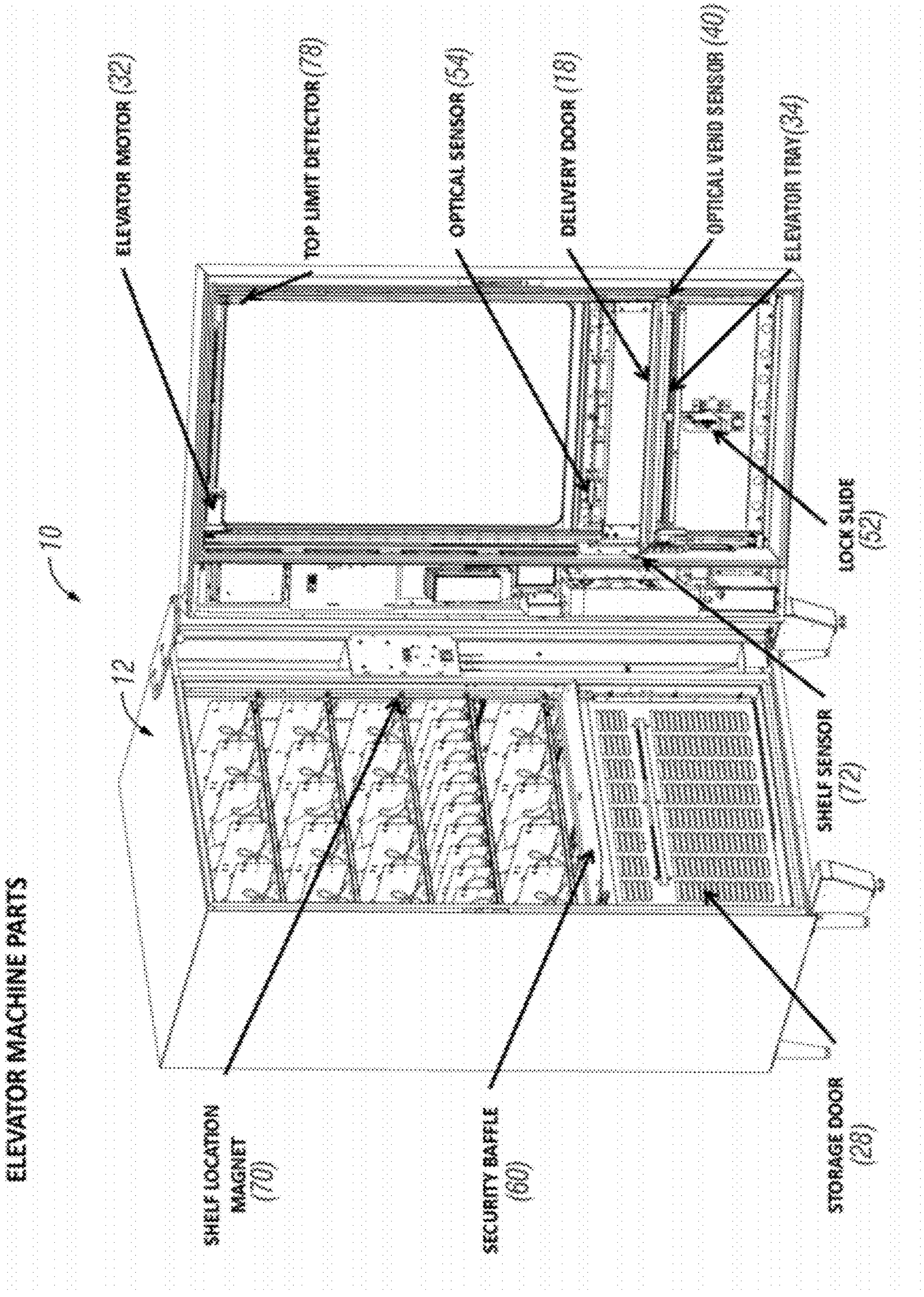
FIG. 2A is a perspective view of the vending machine of FIG. 1 with its front door open, illustrating the product dispensers at various vertical levels or shelves and the elevator mounted on the inside of the front door of the vending machine.
Figure 2B:
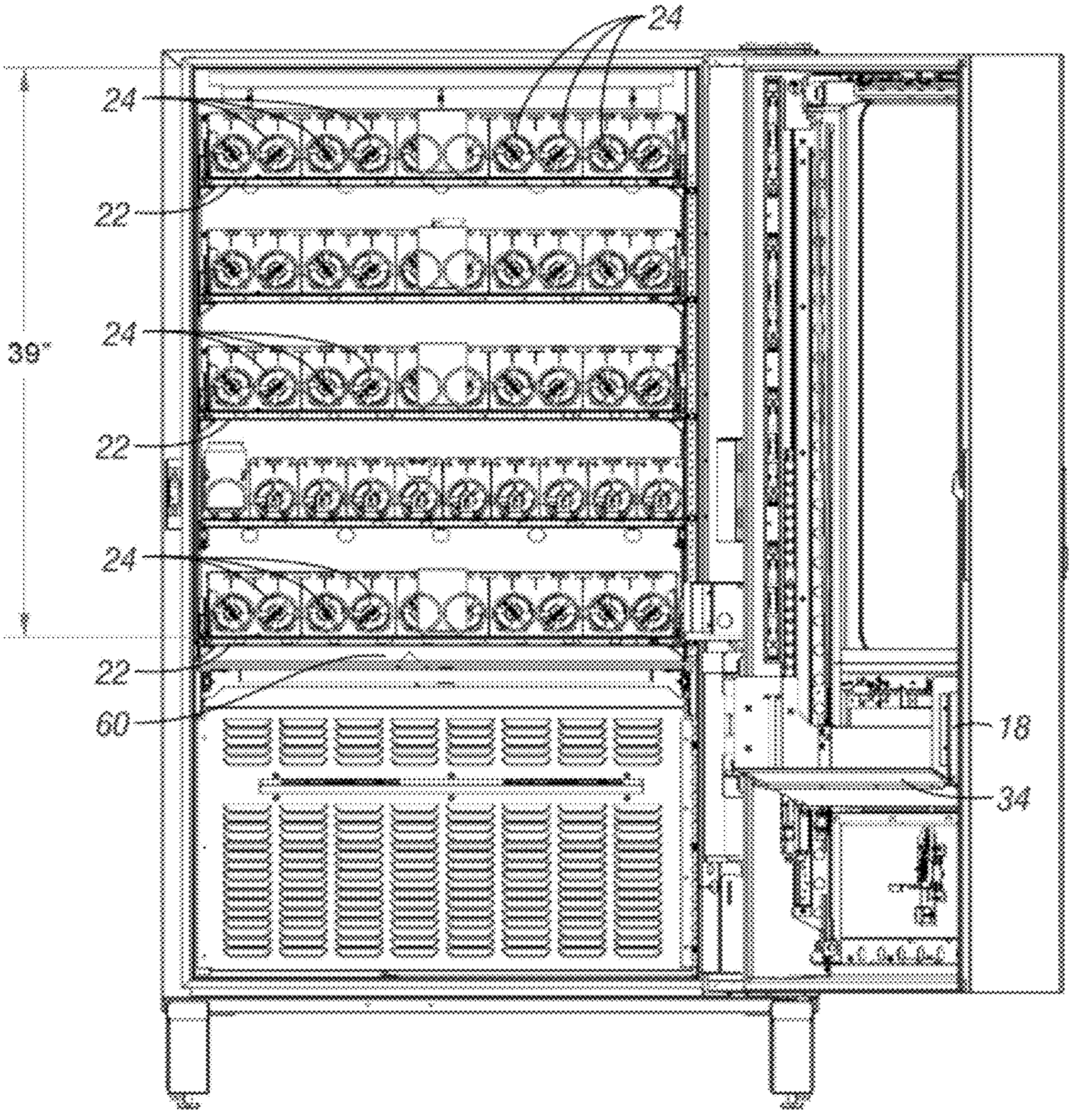
FIG. 2B is a front elevation view of FIG. 2.

FIG. 2B gives details about one form a vending machine 10 can be configured—i.e. one (of many) arrangements of dispensers 24 on multiple shelves 22 in machine interior 20. Reference can be taken to U.S. Pat. Nos. 6,540,102; 6,772,906; and 7,565,222 regarding details of how a vending machine controller (VMC) can take a customer selection from a customer interface (e.g. a keypad) and instruct the appropriate dispenser to dispense the customer-selected vendible product, including how the dispenser motor and associated components accomplish moving a selected product to drop it into a drop zone along the vertical front of machine 10 behind its front face.

A customer selects a product from the keypad of a user interface 14. Elevator system 30 (via EC 90 and motor 32) automatically raises elevator tray 34 so that floor 35 of tray 34 is at the appropriate shelf 22 of the dispenser 24 for the selected product 25 (see FIG. 4). A method is used to inform EC 90 how to accurately "find" the right shelf 22. Delivery door 18 remains locked.

It should be noted that tray 34 of elevator 30 has several features. It is designed to accommodate the largest possible or practicable vendable item utilizing the least possible or practicable amount of horizontal depth. As illustrated in the Figures, tray 34 extends substantially across the width of the interior 20 of machine 10 (at least substantially the width of all possible dispensers 24 on shelves 22) so that products from any such dispenser 24 can be received. Note how its horizontal depth allows freedom of movement between main door 16 and the front edges of shelves/dispensers 22/24 at all vertical levels. But bin 34 and elevator 30 components do not unduly occupy or detract from other needed space in machine 10. Also, note how the floor of bin 34 is angled forwardly (see angle in FIG. 15A). This promotes a received vended product to be urged by gravity towards the front of bin 34 to assist ease of retrieval by a customer.

FIG. 15A illustrates in more detail delivery bin 34 of FIGS. 1-11B. Features of bin 34 of FIG. 15A can include: 1) the angle of the shelf facilities 'free fall' 34 of the vended item into the tray or bin 34; 2) the angle allows the item to sit in the tray 34 and if it should overhang the tray to an extent that it will hit the front edge of the shelves of the vending machine, the item simply pivots from the floor of the tray 34 and falls back as the tray 34 is passed; 3) the front wall of the tray 34 can be transparent which allows the user to see the product being delivered through each step which gives assurance and provides a level of entertainment.

Note also that movement of bin 34 can be intentionally controlled to address ADA requirements on retrieval heights. For example, the Americans with Disabilities Act (ADA) regulations define a certain range of acceptable vending machine retrieval heights from the ground or floor. The newest regulations at this time propose a range of at least 15 inches from the floor to a maximum of 48 inches from the floor. Machine 10 can control elevator 30 to move bin 34 so that the floor of bin 34 is within that range. Vending operators serving "public entities", meaning government locations and locations accessible to the public, must meet new reach requirements of the law beginning Mar. 15, 2012, under the American with Disabilities Act (ADA). The regulations establish side reach regulations requiring that all operable parts of the vending machine be no higher than 48 inches and no lower than 15 inches. This differs from the 1991 standards which have controls at 54 inches high and nine inches low. Machine 10 in the Figures is confirmed to comply with the new requirements.

Also note that there is physical vertical space between the underside of the elevator tray and the floor of the machine. This space is designed to accommodate items which may fall from the shelves as a result of poor loading or the incorrect configuration of the spiral. A common complaint of X/Y picking vending machines is that a fallen item will cause the elevator mechanism to stall/fail to operate.

A vending machine controller (VMC 92) or analogous component instructs the appropriate dispenser to dispense a product 25 forward. Vend confirmation sensor system 40 monitors whether product 25 actually moves into bin 34. If not, a remedial step can be taken by VMC 92. If sensor 40 confirms a dispensing into bin 34, bin 34 receives product 25 which only needs to move or slid forward from dispenser 24 and does not have to drop a substantial distance or slide down a chute or tube.

Since machine 10 has confirmed a dispensed product 25 into bin 34, EC 90 then instructs elevator 30 to move bin 34 back down towards delivery door 18. In this embodiment, it moves bin 34 back down to a "park" position, which is a similar position to "stand by-ready to vend" (see FIG. 6). This "park" position is beneath delivery door 18. Delivery door 18 remains locked.

Figure 7A:
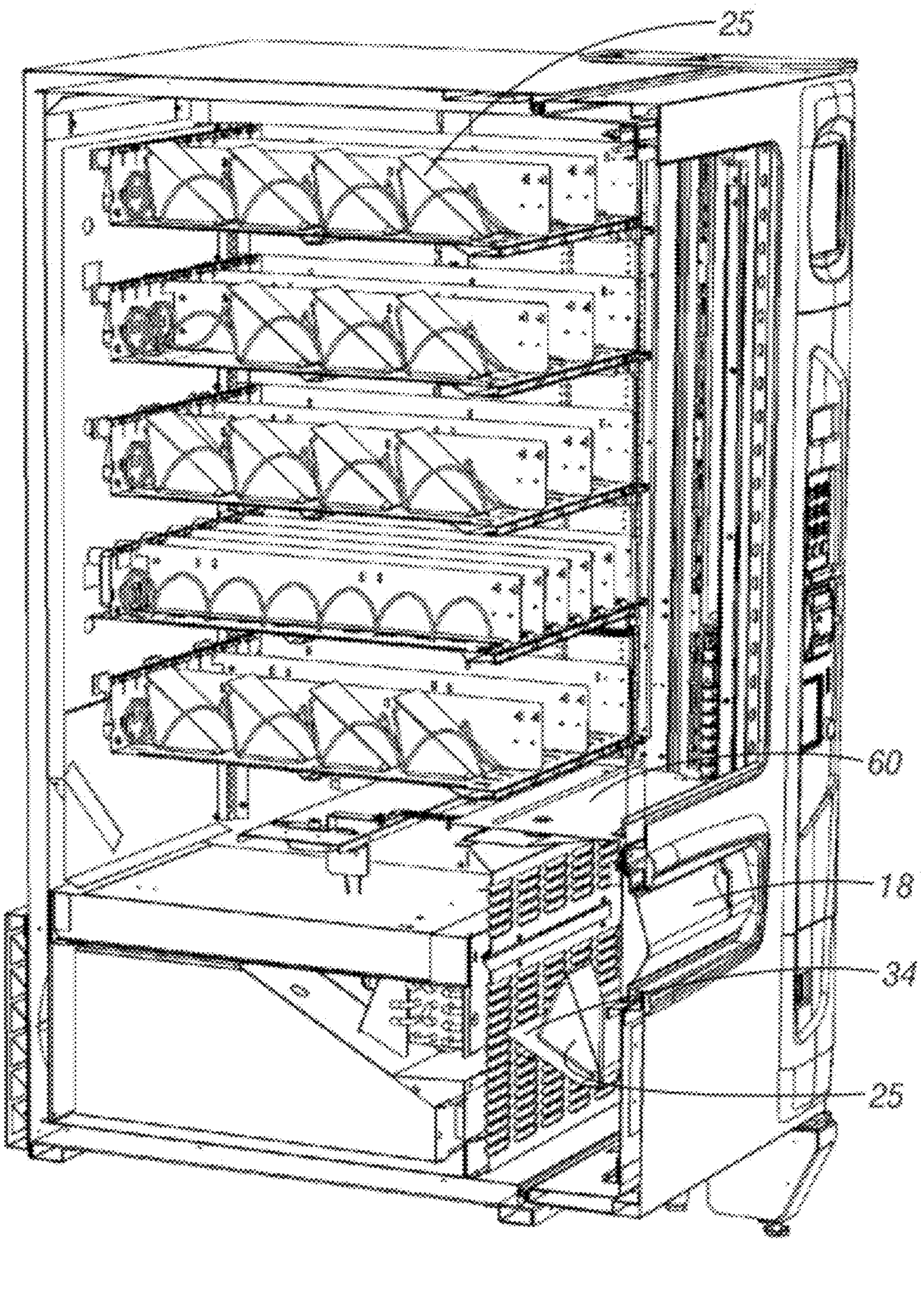
FIGS. 7A and 7B are similar to FIGS. 6A and 6B illustrating the vending machine in the "park" position and additionally showing a security baffle actuated to deter "cheating" of the machine by blocking access to the dispenser shelves.
Figure 7B:
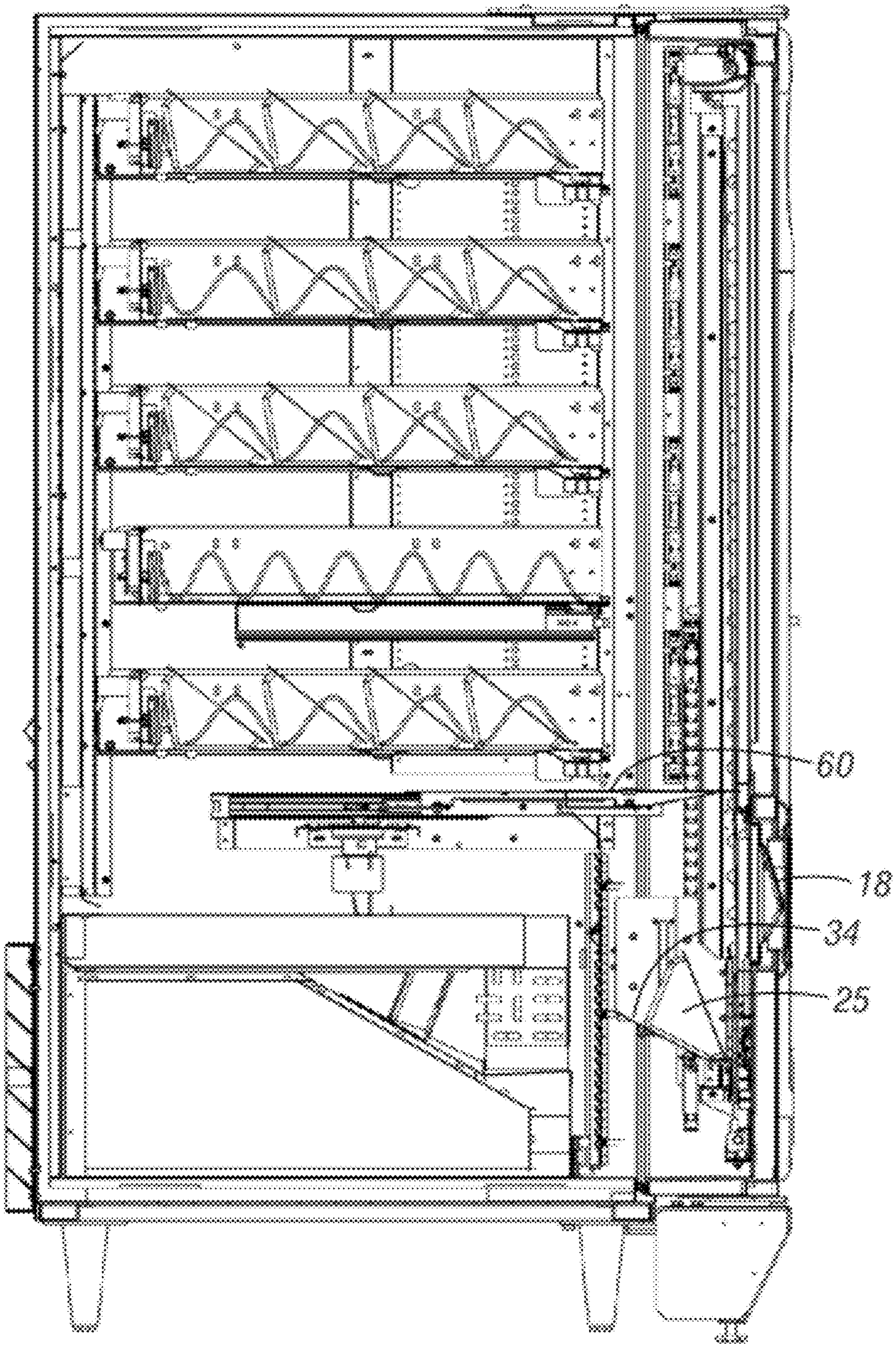
Figure 8A:
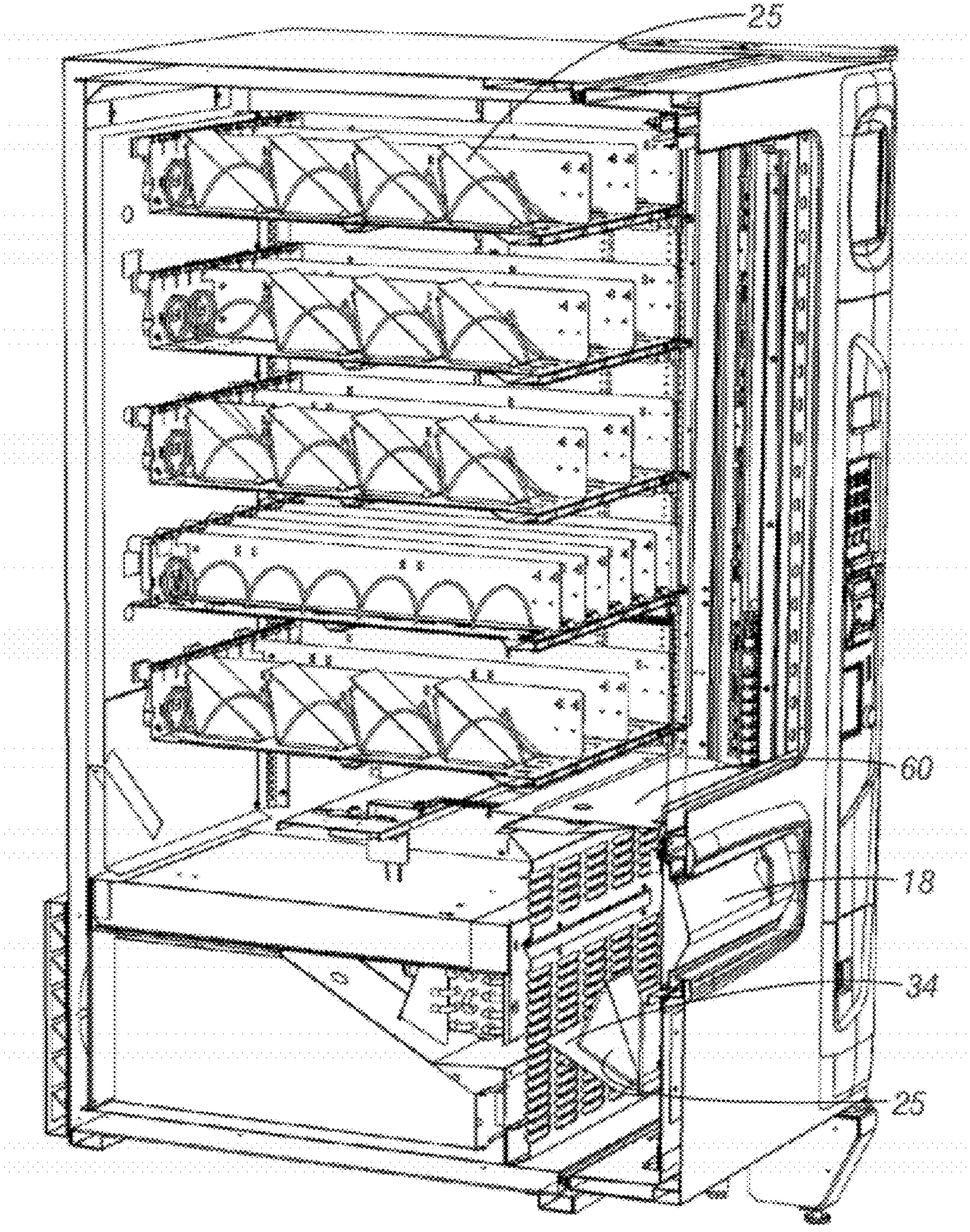
FIGS. 8A and 8B are perspective and side elevation sectional views similar to FIGS. 7A and 7B (with security baffle still actuated) but illustrating the elevator tray slightly lowered some more to a "vend" position allowing a customer to push in an access or delivery door and access the dispensed product in the elevator tray.
Figure 8B:
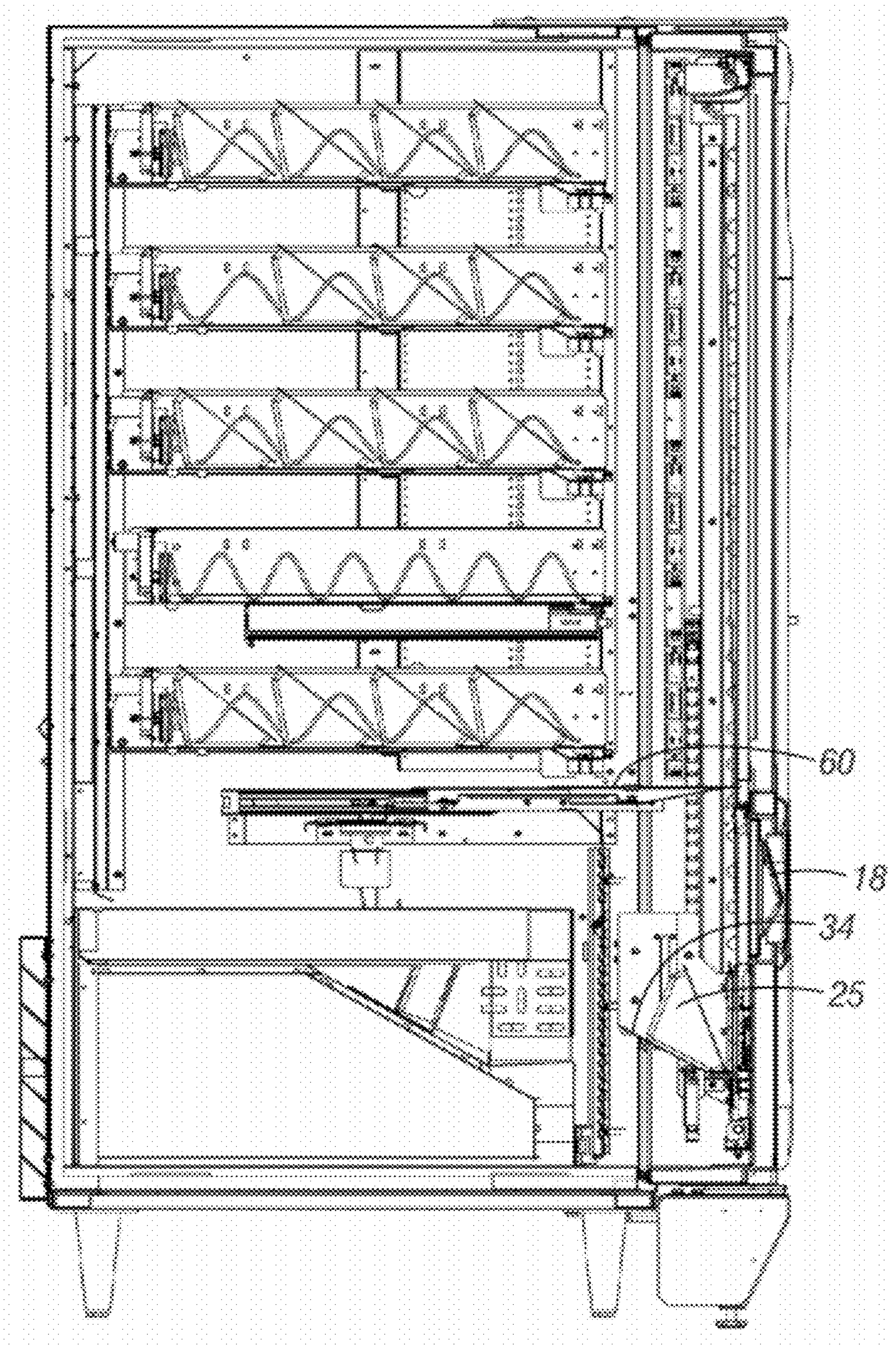
Figure 9A:
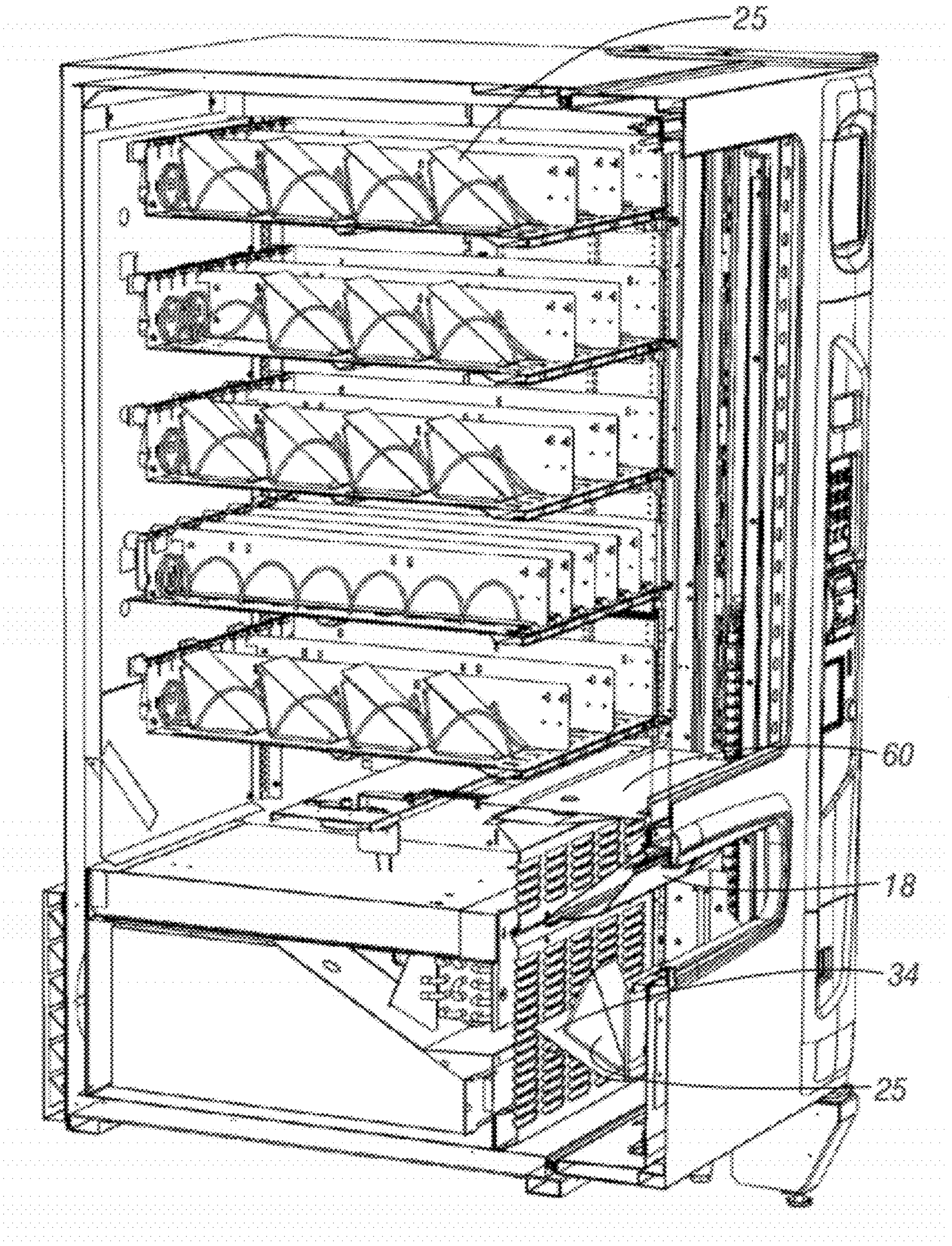
FIGS. 9A and 9B are similar to FIGS. 8A and 8B illustrating the elevator tray in the "vend" position with security baffle actuated and the access or delivery door pushed inward and upward to allow the customer to grab the dispensed product in the elevator tray.
Figure 9B:
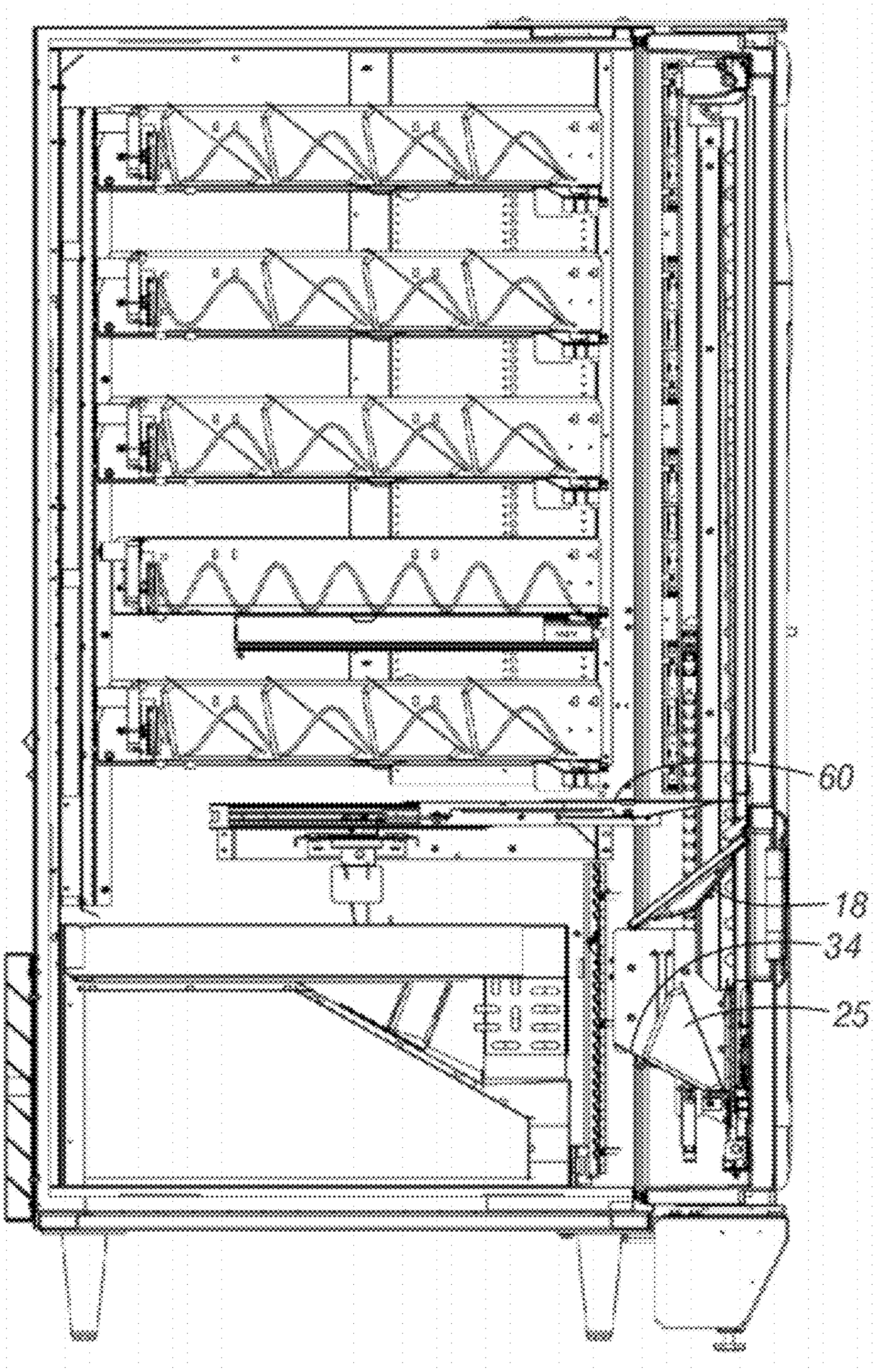
Figure 10A:
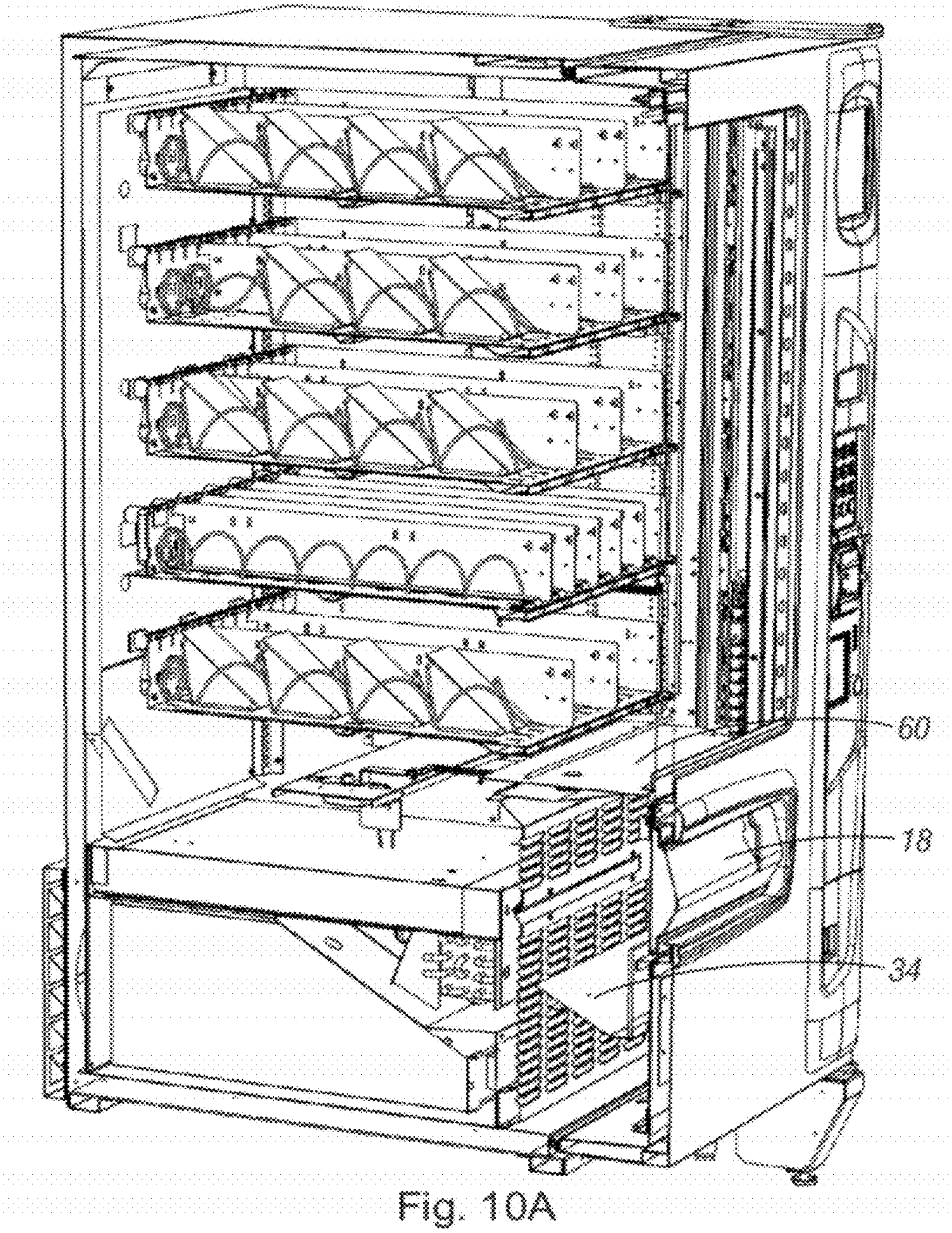
FIGS. 10A and 10B are similar to FIGS. 3A and 3B, with the elevator tray moved slightly up to the "standby" position after the customer has retrieved the dispensed product from the elevator try but with the security baffle still in actuated position.
Figure 10B:
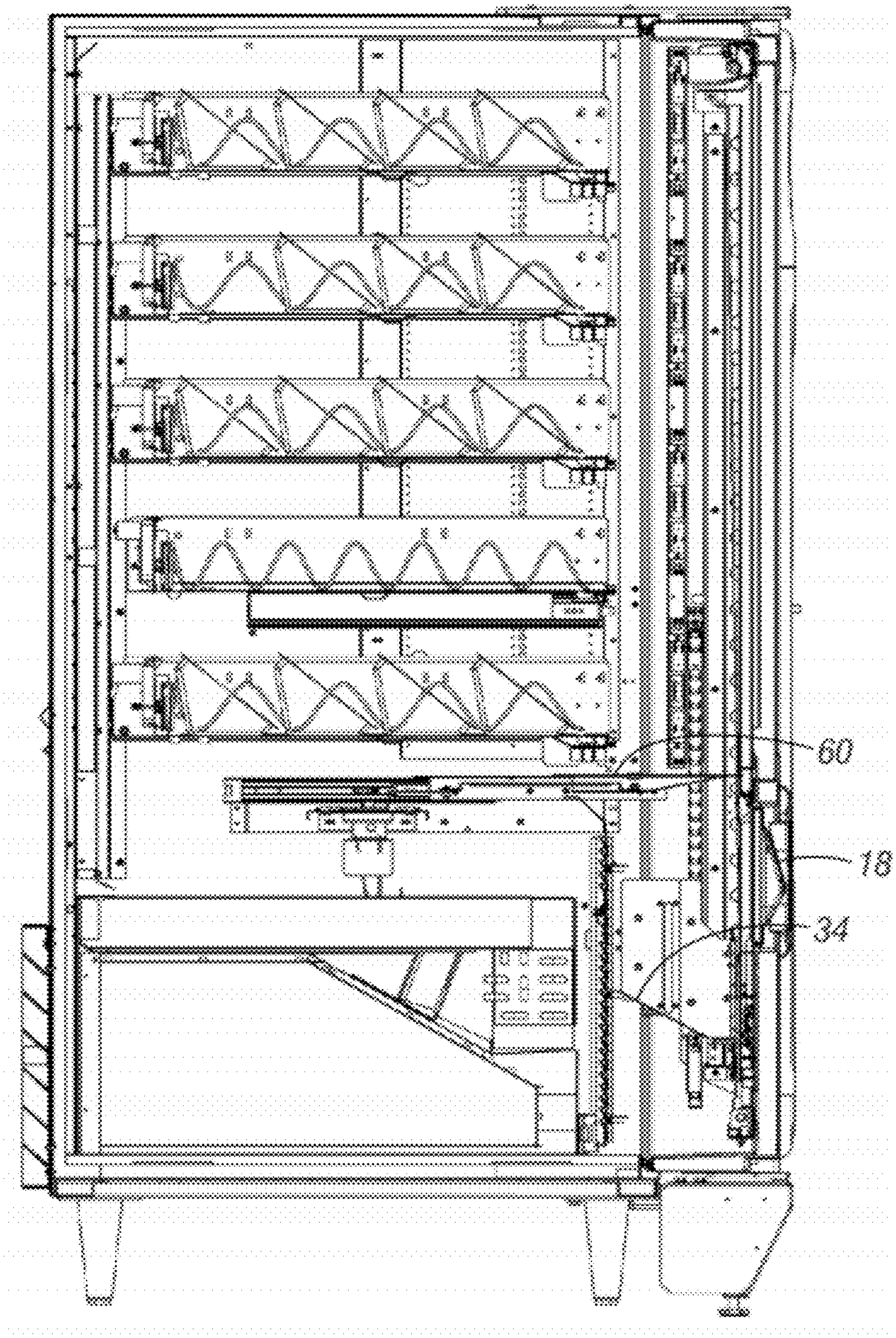

In this embodiment, security baffle 60, which to this point has remained retracted interiorly and out of space 26 between the fronts of dispensers 24 and the glass front door 16, is automatically extended forwardly by instruction from EC 90 (see FIG. 7). It is what is sometimes referred to in this technological field as an "anti-cheat" method—it blocks attempts to reach through delivery door 18 up to dispensers 24 to try to steal products 25. Delivery door 18 remains locked. An electric motor 62 is mounted in cabinet 12 and operatively connected by appropriate linkage (e.g. two arms pivotally connected at adjacent ends) to effectuate horizontal movement of the horizontal baffle plate 60. Baffle 60 can be of a material that is robust enough to resist penetration or destruction by human hands, and to deter cheating. It may even be strong enough to resist destruction by common tools such as knives, screw drivers, or keys. Examples of materials include sheet metal (single or multiple layers), steel, PVC plastic, and the like. Commercially available mechanical limit switches can produce electrical signals to inform VMC 92 when baffle plate 60 is at either its blocking position or its retracted position.

Once security baffle 60 is extended (as monitored by sensors such as limit switches), EC 90 moves elevator tray 34 down to a "Vend" position, somewhat lower than "park" (see FIGS. 8A and B), and moves locking slider 52 to unlock delivery door 18. In this embodiment, EC 90 unlocks door 18 for a limited time (clocked by EC 90—e.g. one minute).This timed unlocked period is intended to allow the customer to push open door 18 (which is pivoted or otherwise mounted to cabinet 12) and retrieve the vended product from bin 34 in its "vend" position (see FIGS. 9A and B). Timing protocols can be programmed into EC 90 or VMC 92, by conventional programming steps within the skill of those skilled in the art. Typical ECs and VMCs come with instructions regarding programming and communication protocols with other devices.

EC 90 monitors door 18 by a sensor (e.g. optical sensor or otherwise). If door 18 is opened during the 4 second period, EC 90 will not move bin 34 up. If door 18 is opened and then closed and remains closed for 4 seconds, EC 90 will start moving tray 34 up to "stand by" position (slightly raised from "vend" position) and re-lock delivery door 18 (see FIGS. 10A and B).

Figure 11A:
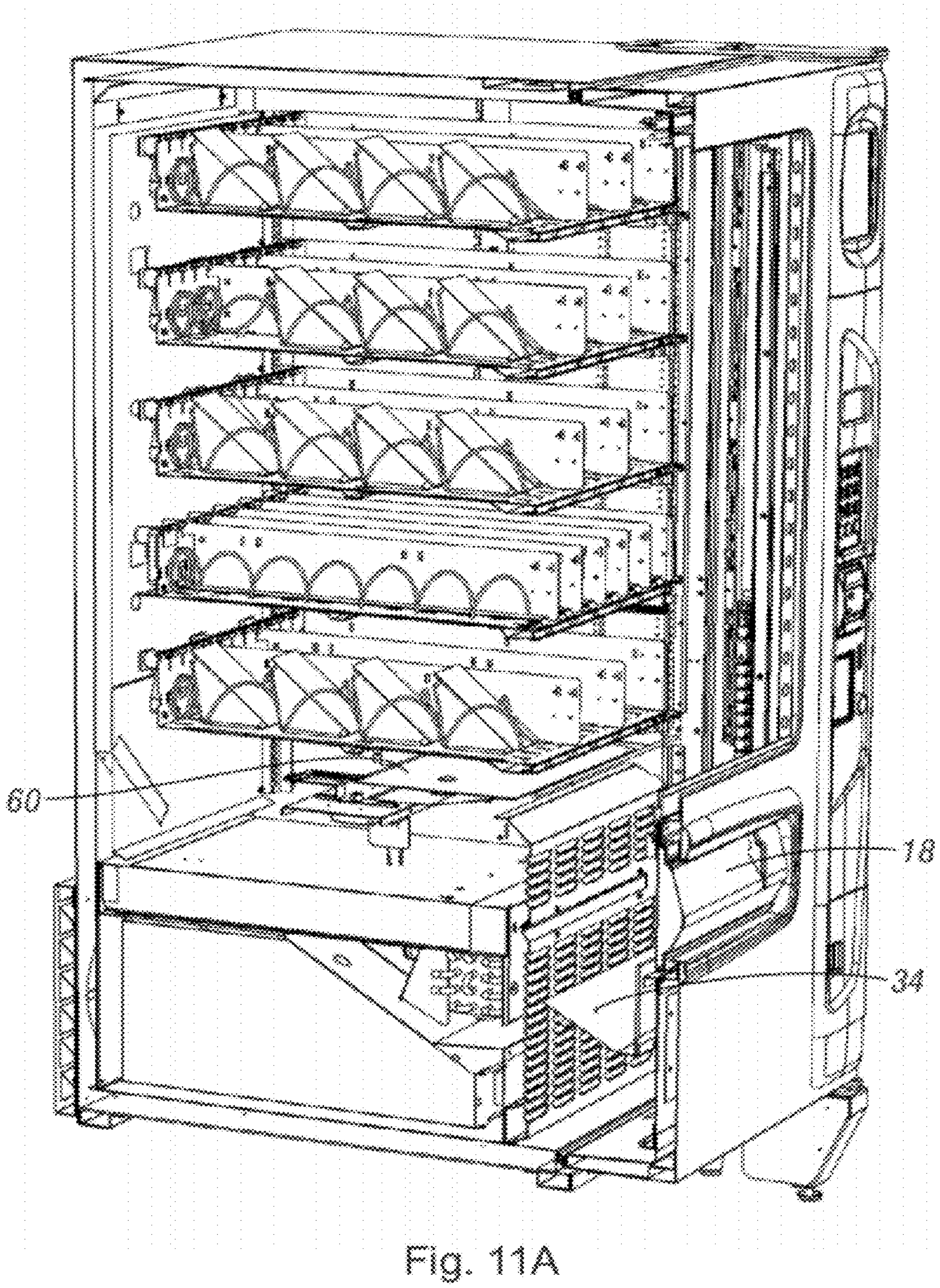
FIGS. 11A and 11B are similar to FIGS. 10A and B illustrating the vending machine in the "standby" position with the security baffle withdrawn and the machine is ready for a next customer selection such as in FIGS. 3A and 3B.
Figure 11B:
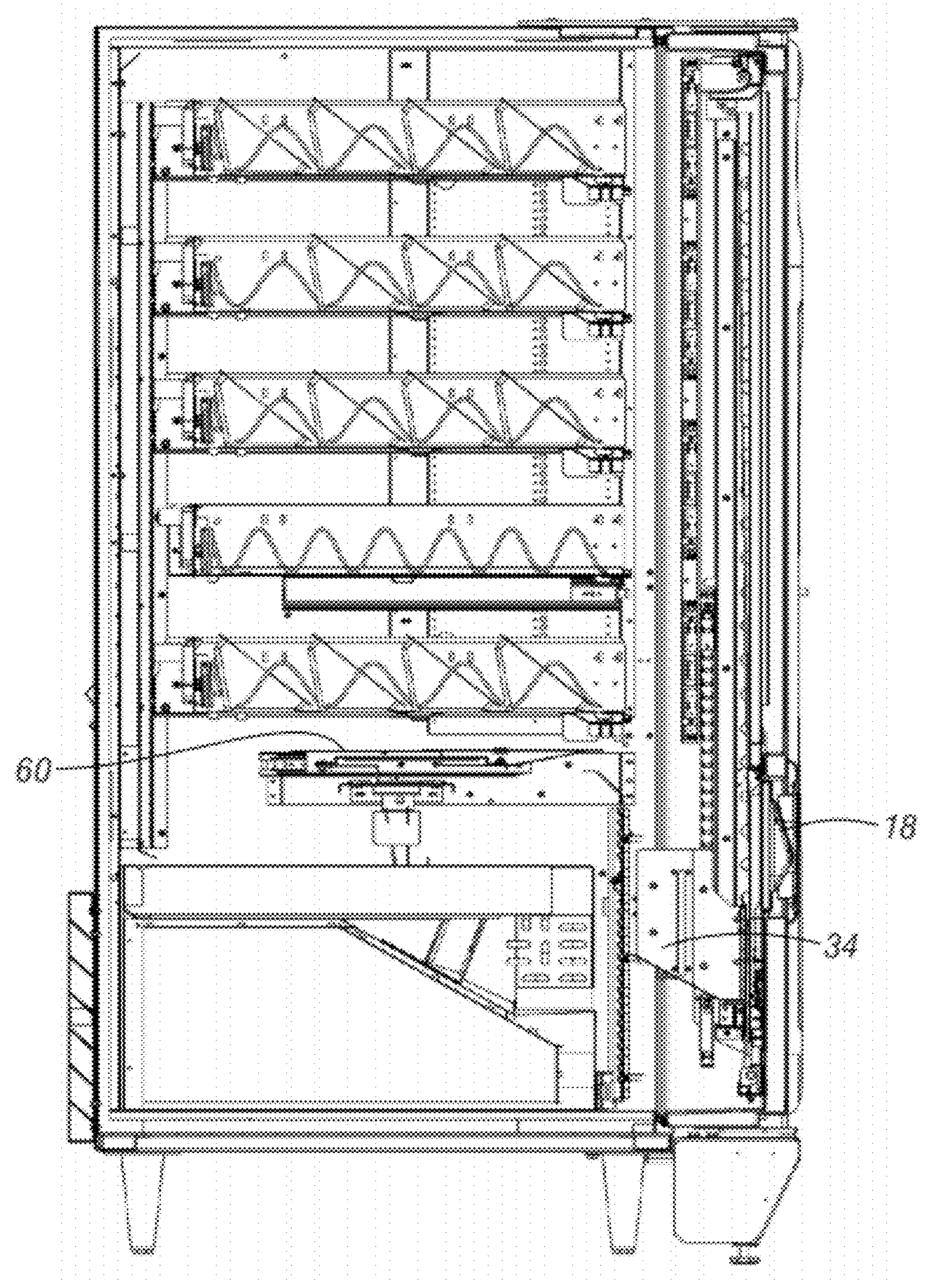

Once tray 34 is sensed to be in "stand by" position, EC 90 will re-set in "stand by-ready to vend" status, and wait for the next customer selection signal from VMC 92 (FIGS. 11A and B). In this embodiment, in the case the customer did not retrieve the dispensed product during the one minute, an override is made possible. The customer is informed (via a user interface display message) that pushing the "#" key of the keypad will unlock delivery door 18. Alternatively or in addition, the vend confirmation sensor can be used to inform VMC 92 and EC 90 that a dispensed product has not been removed, and can display a message to the customer to remove it, and also can unlock door 18 for another timed period.

The foregoing describes the apparatus and method for moving a machine-wide elevator tray 34 up to the level of a dispenser selected to dispense a product, confirm receipt of the product, return towards the bottom of machine 10, and then provide access to the product by presenting tray 34 at access door 18 while (a) unlocking access door 18 and (b) extending security baffle 60 to block customer access up into machine 10.

During operation, the interior of machine 10 is locked from the public by locking machine front door 16. The interior of machine 10 is enclosed. Door 16 can have (but not required) a glass or transparent window. Customer selection controls 14 are on the exterior of cabinet 12. Controls or interface 14 can include any of a variety of input means (keypad, buttons, touch screen, etc.). A display can also display graphic information including messages or prompts to the customer. A speaker can also be incorporated into the interface or machine 10 to give audible warnings or information to the customer.

D. Additional Details

The description above gives some information regarding the apparatus components of the exemplary embodiment and their functions. Additional details can be found below.

FIGS. 12-14 provide additional details regarding the hardware and its functions of the exemplary embodiment. It will be appreciated by those skilled in this technological field that these components are commercially available. Specific components can be selected by the designer according to need or desire.

It is to be appreciated that the 2-channel encoder 80 can be used to inform EC 90 of any of speed, direction of travel, and distance of travel of elevator tray 34. Thus, it allows a "mapping" of position of shelves 22 which can be stored in EC 90 and used to estimate how long and in what direction to operate elevator motor 32 to move it to the various positions to accomplish the functions needed.

EC 90 is contained on a separate circuit board near the VMC 92 circuit board. EC 90 controls both the elevator motor 32 and baffle motor 64 outputs and monitor inputs associated with the entire elevator control system as follows:

a) Dual stage magnetic encoder 80 (mounted to the elevator motor drive shaft).
b) Top limit detector (at top door lock side of the frame).
c) Delivery door lock slide detectors 1 and 2 (located inside the base of the main door 16) (see lock slide and top and bottom switches 52/56 in FIG. 13).
d) Delivery door open/closed optical sensor.
e) Shelf detect reed switch (mounted on the hinge side of the elevator tray).
f) Main door switch (top hinge side corner of door 16).
g) Security baffle "open" and "closed" detectors (top side, front and rear of baffle motor mounting plate).

VMC 92 and EC 90 communicate with each other using a customized protocol (see "Examples of Operation" charts in Section F) which is shared with the DEX (well-known communications protocol) serial bus. VMC 92 is the "master" that issues various command instructions for EC 90 to execute and report back with a status.

In this example there are three states of locking slide 52/56 and its switch logic:

a) Locked—standby position ("TOP" switch at reference number 56 in FIG. 13 is pushed to an activated position and "BOTTOM" switch at reference number 56 in FIG. 13 is in normal (non-activated) position). This logical state is used when the elevator is traveling in an upward direction. The delivery door flap 18 is locked and the security baffle 60 can be opened.
b) Locked—park position ("TOP" switch at reference number 56 in FIG. 13 is in normal (non-activated) position and "BOTTOM" switch at reference number 56 in FIG. 13 is in normal (non-activated) position). This state is used when the elevator is traveling in a downward direction. This position allows the security baffle 60 to be closed prior to moving down to the "vend" position and unlocking the delivery door flap 18.
c) Unlocked—vend position("TOP" switch at reference number 56 in FIG. 13 is in normal (non-activated) position and "BOTTOM" switch at reference number 56 in FIG. 13 is in activated position). The delivery door 18 is unlocked to allow vended items to be retrieved.

Additionally, magnets 70 can be embedded or mounted at or near each shelf 22 and a sensor (e.g. limit detector 72) can sense when elevator tray 18 is adjacent a magnet 70. The sensor can inform the encoder and/or EC 90. Thus, shelf position can be estimated by either or both methods. In this embodiment, it can be by a combination of both. The magnetic sensing can inform encoder 80 when bin 18 is actually at a shelf 22. This can be used to "map" shelf positions, so that encoder 80 could "find" any shelf 22 again by knowing speed/direction/distance simply by motor 32 operation relative to a reference position. But the magnetic sensing can also be a double check, confirmation, or re-calibration every time elevator 30 moves bin 34 to any shelf 22. The type and strength of magnets 70 can be selected according to need or desire. It may be beneficial to mount each magnet 70 in a non-magnetic or non-ferrous casing to deter magnetic leakage from the magnetic to the cabinet or other components (e.g. a plastic case or layer between magnet 70 and cabinet 12 but leaving exposed a magnet surface to the magnetic sensor limit detector 72).

The type of sensors of switches used to monitor magnet 70 location, baffle 60 position, delivery door 18 position, elevator position (e.g. top limit switch 78 to inform EC 90 bin 34 is at the top-most allowed position), delivery door lock slider 52 position, main door 16 open/closed, or other, can vary according to designer need or desire. Certain details about the same are contained in FIGS. 12-14 regarding this particular embodiment. Variations obvious to those skilled in the art are, of course, possible.

FIG. 13 provides an electrical schematic of the hardware for EC 90 and its inter-connection to VMC 92 and to a source of electrical power. EC 90 and VMC 92 are programmable. The designer has flexibility in programming these devices according to their specifications.

Note that in this embodiment, user interface 14 keypad is first communicated to EC 90, which would obtain column/row customer selection information, which would then be passed to VMC 92, which could be conventionally programmed to control dispensing of products. Vend confirmation sensor 40 could be any of a number of types, but one example is I-VEND® available from Fawn Engineering of Des Moines, Iowa.

FIG. 14 provides details regarding certain components and their communication for the embodiment.

E. Flow Chart of One Example of Operation

A general discussion of operation of the exemplary embodiment is described above. A detailed flow chart 100 of one mode of operation of machine 10 with elevator system 30 and attendant components is set forth in FIG. 16*a/b*. The steps and functions of flow chart 100 can be readily correlated with the apparatus details above. Some of the steps of flow chart 100 may differ slightly from the description above, but follow the same general idea of automatically:

a) elevating a delivery tray to a shelf of a customer-selected product automatically while keeping the delivery door locked;

b) confirming a dispensing into the bin;

c) lowering the bin to near the delivery door and closing the security baffle;

d) unlocking the delivery door.

Flow chart 100 also presents other features, which can be readily appreciated from flow chart 100.

The methodology of flow chart 100 can be programmed into EC 90 and VMC 92 according to methods well known to those skilled in this technological field. Variations obvious to those skilled in the art are included.

Additional details of operation of the exemplary embodiment can be found in the sequence chart and elevator protocol charts of Section F, below. Again, these are exemplary. Variations obvious to those skilled in the art are included in the invention.

F. Alternatives and Options

As stated, the foregoing description of exemplary embodiment is to illustrate one, and not all, form the invention can take. Alternatives and options can be included. A few examples are as follows:

a) Vending machine—as mentioned, aspects of the invention can be applied to a variety of different types of vending or automated merchandising machines, and to a variety of vendible products. For example, it could be applied to a non-transparent front machine. It could be applied to a non-refrigerated machine. It could be applied to machines with other than helix-type dispensers.

b) Size and configuration—as mentioned, the size and configuration of components can be scaled up or down from the exemplary embodiment, or components or sets of components can be replaced with components that provide analogous functions.

c) Materials—materials for the components can be as deemed appropriate or needed by a designer skilled in the technological field. For example, the security baffle can be made of material that would be robust enough to repel or deter cheating methods (hands and arms, or tools). The delivery bin, elevator rails, locks, motors, switches, etc. can be selected as needed to accomplish their functions in light of the application to which they are presented. Sheet metal is a candidate for many structural items. Performance of the pieces and components can be empirically derived or from specifications from manufacturers or distributors of commercially available items.

d) Alternative Security Baffle—instead of a plate, it could be curved or drum-like and rotated between blocked and unblocked positions.

e) Optional feature—a small rubber flap could be positioned at the front edge of each shelf to allow passage of the elevator bin but block most things from falling between the front edge of the shelves or dispensers and the elevator tray. One example of the material is flexible neoprene, with no memory. It could also act as a "bridge" to help move a dispensed product from the dispenser to the bin.

f) Optional feature—the user interface could include a touch screen.

g) Optional feature—a light on the elevator could highlight individual products.

h) Optional feature—a sensor could sense when the delivery door is open for a number of reasons.

Optional feature—as mentioned previously, a plastic jacket could be used around the magnets so that permeability leaks are avoided into the cabinet and to prevent credit cards from being disrupted or erased.

i) Optional feature—system software could include an auto-calibration routine which re-calibrates sensed or estimated shelf positions each vend.

Other features or options are, of course, possible. Variations obvious to those skilled in the art are included.

Examples of Operation

The following charts describe one way of system sequence and operation of the elevator sub-system of FIGS. 1 to 15A-D over a vend cycle.

| Power-Up Sequence Switch-On or Power Interruption after Brown-Out | | 1 MICROSWITCHES S1 & S2 Delivery Door UNLOCKED, PARK & STANDBY positions (Actuated by the Elevator) | 4 REED SWITCH Delivery Door 'Closed' - When closed it is actuated by its associated Magnet Actuated = 1 (Com/NO) | 5 MICROSWITCH Security Baffle Closed - Limit Switch Actuated = 1 (Com/NO) | 6 MICROSWITCH Security Baffle Open - Limit Switch Actuated = 1 (Com/NO) | 7 REED SWITCH Located on Elevator to Sense Shelf Positions (norm 5, max 6) Actuated = 1 (Com/NO) | 8 MICROSWITCH Elevator Top Position Limit Switch Actuated = 1 (Com/NO) | Notes |
|---|---|---|---|---|---|---|---|---|
| Step | Condition | | | | | | | TBD - does the VMC impose a reset & communicate the max. selection number for diagnostic |

-continued

| Power-Up Sequence Switch-On or Power Interruption after Brown-Out | | 1 MICROSWITCHES S1 & S2 Delivery Door UNLOCKED, PARK & STANDBY positions (Actuated by the Elevator) | 4 REED SWITCH Delivery Door 'Closed' - When closed it is actuated by its associated Magnet Actuated = 1 (Com/NO) | 5 MICROSWITCH Security Baffle Closed - Limit Switch Actuated = 1 (Com/NO) | 6 MICROSWITCH Security Baffle Open - Limit Switch Actuated = 1 (Com/NO) | 7 REED SWITCH Located on Elevator to Sense Shelf Positions (norm 5, max 6) Actuated = 1 (Com/NO) | 8 MICROSWITCH Elevator Top Position Limit Switch Actuated = 1 (Com/NO) | Notes |
|---|---|---|---|---|---|---|---|---|
| | | | | | | | | purposes i.e. # of shelves?? |
| 1A | Check Access Door Flap is CLOSED: If NO flag VMC to display the message "First, please close the delivery door", if/when Access Door flap is closed flag the VMC appropriately | N/A | 0 | N/A | N/A | N/A | N/A | Display "Preparing Elevator" during the whole of the power-up sequence |
| 1B | Above step successful - | N/A | 1 | N/A | N/A | N/A | N/A | |
| 2A | Check Access Door Flap is LOCKED: If NO and Access the Door is CLOSED: then drive elevator UP (slow drive) to the PARK position. If already in PARK position jump to Step 3A | 10 | 1 | N/A | N/A | N/A | N/A | Note: If already at the PARK position move to next step |
| 2B | Above step successful- | 00 | 1 | N/A | N/A | N/A | N/A | |
| 3A | Check Security Baffle is OPEN: If NO drive to OPEN position | 00 | 1 | 1 or 0 | 0 | N/A | N/A | Motor is unidirec-tional (360° cyclic cam) |
| 3B | Above step successful - | 00 | 1 | 0 | 1 | N/A | N/A | |
| 4A | Drive elevator to the TOP LIMIT SWITCH | 01 | 1 | 0 | 1 | N/A | N/A | Motor Drive starts with a voltage ramp to 50% (TBC) for 1 second (TBC) TBD - Check for a minimum of 5 shelves as a default diagnostic?? Log the distance between shelves utilizing the magnetic encoder. |

-continued

| Power-Up Sequence Switch-On or Power Interruption after Brown-Out | | 1 MICROSWITCHES S1 & S2 Delivery Door UNLOCKED, PARK & STANDBY positions (Actuated by the Elevator) | 4 REED SWITCH Delivery Door 'Closed' - When closed it is actuated by its associated Magnet Actuated = 1 (Com/NO) | 5 MICROSWITCH Security Baffle Closed - Limit Switch Actuated = 1 (Com/NO) | 6 MICROSWITCH Security Baffle Open - Limit Switch Actuated = 1 (Com/NO) | 7 REED SWITCH Located on Elevator to Sense Shelf Positions (norm 5, max 6) Actuated = 1 (Com/NO) | 8 MICROSWITCH Elevator Top Position Limit Switch Actuated = 1 (Com/NO) | Notes |
|---|---|---|---|---|---|---|---|---|
| 4B | As each shelf is detected | 01 | 1 | 0 | 1 | 1 | 0 | Also check speed variation beyond +/− 30%. Note S1 & S2 have moved to Standby position |
| 4C | Upon reaching shelf 5 (going up) switch to slow drive | 01 | 1 | 0 | 1 | 1 | 0 | Subject to note above, if max. selection number sent during PU sequence the slow drive will kick-in when reaching the top shelf |
| 4D | Upon reaching the TOP LIMIT immediately stop drive | 01 | 1 | 0 | 1 | 0 | 1 | |
| 4E | 1 second delay | 01 | 1 | 0 | 1 | 0 | 1 | TBD - Maybe necessary to apply a holding voltage to prevent the motor back-driving due to gravitational weight of elevator |
| 5A | After 1 second delay drive elevator DOWN to PARK position | 01 | 1 | 0 | 1 | 0 | 0 | When reaching the bottom shelf start 'slow drive' |
| 5B | Upon reaching bottom shelf switch to slow drive | 1 | 1 | 0 | 1 | 1 | 0 | |
| 5C | When LOCK SLIDE switch 2 transitions, immediately switch motor OFF | 00 | 1 | 0 | 1 | 0 | 0 | |
| 6A | Drive Security Baffle to CLOSED position | 00 | 1 | 0 | 1 | 0 | 0 | |
| 6B | Above step successful - | 00 | 1 | 1 | 0 | 0 | 0 | |
| 7A | Drive elevator DOWN (slow drive) to the UNLOCKED position | 00 | 1 | 1 | 0 | 0 | 0 | |
| 7B | Above step successful - | 10 | 1 | 1 | 0 | 0 | 0 | |

-continued

| Power-Up Sequence Switch-On or Power Interruption after Brown-Out | | 1 MICROSWITCHES S1 & S2 Delivery Door UNLOCKED, PARK & STANDBY positions (Actuated by the Elevator) | 4 REED SWITCH Delivery Door 'Closed' - When closed it is actuated by its associated Magnet Actuated = 1 (Com/NO) | 5 MICROSWITCH Security Baffle Closed - Limit Switch Actuated = 1 (Com/NO) | 6 MICROSWITCH Security Baffle Open - Limit Switch Actuated = 1 (Com/NO) | 7 REED SWITCH Located on Elevator to Sense Shelf Positions (norm 5, max 6) Actuated = 1 (Com/NO) | 8 MICROSWITCH Elevator Top Position Limit Switch Actuated = 1 (Com/NO) | Notes |
|---|---|---|---|---|---|---|---|---|
| 8A | Check Door Flap is CLOSED: If NO flag VMC to display the message "First, please close the delivery door", if/when Access Door flap is closed flag the VMC appropriately | 10 | 1 | 1 | 0 | 0 | 0 | |
| 9A | After a 1 second delay drive elevator UP to the PARK position | 10 | 1 | 1 | 0 | 0 | 0 | |
| 9B | Above step successful - | 00 | 1 | 1 | 0 | 0 | 0 | |
| 10A | Drive SECURITY BAFFLE to the OPEN position | 00 | 1 | 1 | 0 | 0 | 0 | |
| 10B | Above step successful - | 00 | 1 | 0 | 1 | 0 | 0 | |
| 11A | After a 20 second delay drive elevator UP to the STANDBY position | 00 | 1 | 0 | 1 | 0 | 0 | |
| 11B | Above step successful - END-STANDBY READY TO VEND | 01 | 1 | 0 | 1 | 0 | 0 | |

| Vend Cycle Sequence Assumes in an initialized state | | 1 MICROSWITCHES S1 & S2 Delivery Door UNLOCKED, PARK & STANDBY positions (Actuated by the Elevator) | 4 REED SWITCH Delivery Door 'Closed' - When closed it is actuated by its associated Magnet Actuated = 1 (Com/NO) | 5 MICROSWITCH Security Baffle closed - Limit Switch Actuated = 1 (Com/NO) | 6 MICROSWITCH Security Baffle Open - Limit Switch Actuated = 1 (Com/NO) | 7 REED SWITCH Located on Elevator to Sense Shelf Positions (norm 5, max 6) Actuated = 1 (Com/NO) | 8 MICROSWITCH Elevator Top Position Limit Switch Actuated = 1 (Com/NO) | Notes |
|---|---|---|---|---|---|---|---|---|
| Step | Condition | | | | | | | Motor Drive starts UP/DOWN with a voltage ramp to 50% (TBC) for 1 second (TBC) |
| 1 | Check the Door Flap is CLOSED, the Door Slide is in the STANDBY | 01 | 1 | 0 | 1 | 0 | 0 | NOTE: Both the following conditions constitutes a reset and a need to |

-continued

| | Vend Cycle Sequence Assumes in an initialized state | 1 MICROSWITCHES S1 & S2 Delivery Door UNLOCKED, PARK & STANDBY positions (Actuated by the Elevator) | 4 REED SWITCH Delivery Door 'Closed' - When closed it is actuated by its associated Magnet Actuated = 1 (Com/NO) | 5 MICROSWITCH Security Baffle closed - Limit Switch Actuated = 1 (Com/NO) | 6 MICROSWITCH Security Baffle Open - Limit Switch Actuated = 1 (Com/NO) | 7 REED SWITCH Located on Elevator to Sense Shelf Positions (norm 5, max 6) Actuated = 1 (Com/NO) | 8 MICROSWITCH Elevator Top Position Limit Switch Actuated = 1 (Com/NO) | Notes |
|---|---|---|---|---|---|---|---|---|
| | position & the Security Baffle is OPEN | | | | | | | reinitialize: 1. If the Door slide is not in the Standby position 2. If Door Slide is in a standby position and Door Access Flap 3. If the Door Slide is in a standby position and the Security Baffle is Closed |
| 2 | Drive Elevator UP to the required shelf position, upon arrival the motor is turned OFF immediately | 01 | 1 | 0 | 1 | 0/1 | 0 | If the selected shelf is the bottom shelf, the elevator will be driven to it in the 'Slow' mode. Otherwise the motor will ramp to the 'Slow' mode as it passes the previous shelf location. TBD - It maybe necessary to apply a holding voltage to prevent the motor back-driving due to gravitational weight of elevator |
| 3 | VMC drives spiral motor to dispense item from shelf into the Elevator Bin | 01 | 1 | 0 | 1 | 1 | 0 | |
| 4 | As item passes from the shelf to the bin (a small vertical drop) it breaks the I-Vend scanner sensor to confirm success | 01 | 1 | 0 | 1 | 1 | 0 | |
| 5 | Motor controller waits for the 'Success' or | 01 | 1 | 0 | 1 | 1 | 0 | If 'Fail', elevator is driven DOWN to the |

-continued

| | Vend Cycle Sequence Assumes in an initialized state | 1 MICROSWITCHES S1 & S2 Delivery Door UNLOCKED, PARK & STANDBY positions (Actuated by the Elevator) | 4 REED SWITCH Delivery Door 'Closed' - When closed it is actuated by its associated Magnet Actuated = 1 (Com/NO) | 5 MICROSWITCH Security Baffle closed - Limit Switch Actuated = 1 (Com/NO) | 6 MICROSWITCH Security Baffle Open - Limit Switch Actuated = 1 (Com/NO) | 7 REED SWITCH Located on Elevator to Sense Shelf Positions (norm 5, max 6) Actuated = 1 (Com/NO) | 8 MICROSWITCH Elevator Top Position Limit Switch Actuated = 1 (Com/NO) | Notes |
|---|---|---|---|---|---|---|---|---|
| | ''Fail' signal in order to proceed. See NOTES for the 'FAIL' actions | | | | | | | PARK position and will wait 20 seconds for further instructions, after which the elevator will be driven to the PARK position |
| 6 | After receiving 'Success' the elevator is driven DOWN to the PARK position | 01 | 1 | 0 | 1 | 0/1 | 0 | Display "The Selected Item is on its Way" When passing the bottom shelf the motor will revert to slow mode |
| 7 | Elevator arrives at the PARK position | 00 | 1 | 0 | 1 | 0 | 0 | |
| 8 | Security Baffle is driven to CLOSE | 00 | 1 | 0 | 1 | 0 | 0 | |
| 9 | Once closed the elevator is driven DOWN to the UNLOCKED 'VEND' position | 00 | 1 | 1 | 0 | 0 | 0 | Display "Please Remove Your Product" - If Delivery Door has not been opened after 10 seconds sound the double bleep prompt every 10 seconds |
| 10 | Upon reaching the UNLOCKED position the user is able to retrieve the purchased item, the elevator remains in this location for 10 seconds | 10 | 1/0 | 1 | 0 | 0 | 0 | At the point the SW1 transitions the motor will overrun for a period equal to ¾" travel before being switched OFF. Timing needs to be a variable. |
| 11 | After 10 seconds or a subsequent vend request check the Access Door Flap is CLOSED: If NO flag VMC to display the message "Please Close Delivery | 10 | 1 | 1 | 0 | 0 | 0 | VMC will communicate a vend request to terminate the 10 second time-out |

-continued

| | Vend Cycle Sequence Assumes in an initialized state | 1 MICROSWITCHES S1 & S2 Delivery Door UNLOCKED, PARK & STANDBY positions (Actuated by the Elevator) | 4 REED SWITCH Delivery Door 'Closed' - When closed it is actuated by its associated Magnet Actuated = 1 (Com/NO) | 5 MICROSWITCH Security Baffle closed - Limit Switch Actuated = 1 (Com/NO) | 6 MICROSWITCH Security Baffle Open - Limit Switch Actuated = 1 (Com/NO) | 7 REED SWITCH Located on Elevator to Sense Shelf Positions (norm 5, max 6) Actuated = 1 (Com/NO) | 8 MICROSWITCH Elevator Top Position Limit Switch Actuated = 1 (Com/NO) | Notes |
|---|---|---|---|---|---|---|---|---|
| | Door" and sound the Double Bleep prompt every 10 seconds. If the Delivery Door has been opened/closed and the I-vend remains blocked then continue to display the 'Remove Item' message and sounding the prompt for 1 minute. | | | | | | | |
| 12 | Assuming the Access Door Flap is closed and I-Vend is not blocked, in 'slow mode' drive elevator to the STANDBY position | 10 | 1 | 1 | 0 | 0 | 0 | |
| 13 | Upon reaching the STANDBY position drive the Security Baffle to the OPEN position | 00/01 | 1 | 1 | 0 | 0 | 0 | |
| 14 | STANDBY READY TO VEND | 01 | 1 | 0 | 1 | 0 | 0 | NOTE: At any time in STANDBY mode a user of the machine can press the * button on the keypad to return the elevator to the unlocked position. The VMC will communicate this command |

| Standby to Unlocked Sequence | | 1 MICROSWITCHES S1 & S2 Delivery Door UNLOCKED, PARK & STANDBY positions (Actuated by the Elevator) | 4 REED SWITCH Delivery Door 'Closed' - When closed it is actuated by its associated Magnet Actuated = 1 (Com/NO) | 5 MICROSWITCH Security Baffle closed - Limit Switch Actuated = 1 (Com/NO) | 6 MICROSWITCH Security Baffle Open - Limit Switch Actuated = 1 (Com/NO) | 7 REED SWITCH Located on Elevator to Sense Shelf Positions (norm 5, max 6) Actuated = 1 (Com/NO) | 8 MICROSWITCH Elevator Top Position Limit Switch Actuated = 1 (Com/NO) | Notes |
|---|---|---|---|---|---|---|---|---|
| Step | Condition | | | | | | | |
| 1 | STANDBY READY TO VEND | 01 | 1 | 0 | 1 | 0 | 0 | Motor Drive starts UP/DOWN with a voltage ramp to 50% (TBC) for 1 second (TBC) NOTE: At any time in STANDBY mode a user of the machine can press the * button on the keypad to return the elevator to the unlocked position. The VMC will commicate this command |
| 2 | Drive the Security Baffle to the CLOSED position | 01 | 1 | 0 | 1 | 0 | 0 | |
| 3 | Once CLOSED the elevator is driven DOWN to the UNLOCKED position | 01/00 | 1 | 1 | 0 | 0 | 0 | |
| 4 | Upon reaching the UNLOCKED position the user is able to retrieve the purchased item, the elevator remains in this location for 30 seconds | 10 | 1/0 | 1 | 0 | 0 | 0 | At the point the SW1 transitions the motor will overrun for a period equal to ¾" travel before being switched OFF. Timing needs to be a variable. |
| 5 | After 30 seconds or a subsequent vend request check the Access Door Flap is CLOSED: If NO flag VMC to display the message "First, please close the delivery door" | 10 | 1 | 1 | 0 | 0 | 0 | VMC will communicate a vend request to terminate the 30 second time-out |

-continued

| | Standby to Unlocked Sequence | 1 MICROSWITCHES S1 & S2 Delivery Door UNLOCKED, PARK & STANDBY positions (Actuated by the Elevator) | 4 REED SWITCH Delivery Door 'Closed' - When closed it is actuated by its associated Magnet Actuated = 1 (Com/NO) | 5 MICROSWITCH Security Baffle closed - Limit Switch Actuated = 1 (Com/NO) | 6 MICROSWITCH Security Baffle Open - Limit Switch Actuated = 1 (Com/NO) | 7 REED SWITCH Located on Elevator to Sense Shelf Positions (norm 5, max 6) Actuated = 1 (Com/NO) | 8 MICROSWITCH Elevator Top Position Limit Switch Actuated = 1 (Com/NO) | Notes |
|---|---|---|---|---|---|---|---|---|
| 6 | Assuming the Access Door Flap is closed, in 'slow mode' drive elevator to the STANDBY position | 10 | 1 | 1 | 0 | 0 | 0 | |
| 7 | Upon reaching the STANDBY position drive the Security Baffle to the OPEN position | 00/01 | 1 | 1 | 0 | 0 | 0 | |
| 8 | STANDBY READY TO VEND | 01 | 1 | 0 | 1 | 0 | 0 | |

What is claimed is:

1. A method of vending products comprising:

a. storing vendible products at various horizontal positions across a width of and at various vertical heights in an enclosed vending machine with a locked access door;

b. receiving in a moveable receiving tray or bin from a dispenser a vendible product from anywhere across the width and at or near its stored vertical height upon customer selection with the access door locked, wherein the receiving tray or bin spans a substantial part of the width of the vending machine and the steps of receiving and moving comprise elevating and lowering the receiving tray or bin over and elevator pathway having a vertical range in the vending machine;

c. automatically providing an assurance of receipt of the vendible product in the receiving tray or bin with the access door locked;

d. moving the receiving tray or bin with the received product along the elevator pathway down to at or near the access door with the access door locked;

e. moving a security baffle separately from the receiving tray or bin from a retracted position relative the elevator pathway into blocking position across at least a portion of the elevator pathway above the received product in the receiving tray or bin when the receiving tray or bin is at or near the access door;

f. unlocking the access door to enable access to the receiving tray or bin and to deter reaching past an unlocked access door to the dispensers; and g. locking the access door and removing the security baffle from a position across the pathway and above the receiving tray or bin upon an indication that either (1) the received product has been removed or (2) a parameter is met.

2. The method of claim 1 wherein the step of automatically providing assurance of receipt of the vendible product comprises sensing a parameter indicative of movement of a vendible product.

3. The method of claim 1 wherein the step of unlocking the access door comprises sensing the position of the received product at or near the access door.

4. The method of claim 1 wherein the step of unlocking and locking the access door is coordinated with the position of the received product.

5. The method of claim 1 further comprising blocking access to other vendible products in the vending machine when the access door is unlocked.

* * * * *